(12) United States Patent
Saito

(10) Patent No.: US 7,123,391 B2
(45) Date of Patent: Oct. 17, 2006

(54) COLOR IMAGE PROCESSING METHOD AND APPARATUS

(75) Inventor: Kazuhiro Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 987 days.

(21) Appl. No.: 10/253,937

(22) Filed: Sep. 25, 2002

(65) Prior Publication Data

US 2003/0076516 A1 Apr. 24, 2003

(30) Foreign Application Priority Data

Sep. 27, 2001 (JP) ............................. 2001-297443

(51) Int. Cl.
*G03F 3/08* (2006.01)
(52) U.S. Cl. ...................................... 358/518; 382/167
(58) Field of Classification Search ........ 358/518–523, 358/529–530, 505, 515, 1.9; 382/162, 167; 359/726, 291; 347/43
See application file for complete search history.

(56) References Cited

U.S. PATENT DOCUMENTS

2002/0021458 A1  2/2002  Saito et al. ................. 358/515

*Primary Examiner*—King Y. Poon
*Assistant Examiner*—Saeid Ebrahimi-Dehkordy
(74) *Attorney, Agent, or Firm*—Fitzpatrick, Cella, Harper & Scinto

(57) ABSTRACT

Color image processing method and apparatus which perform color separation to separate colors of image data to color-material colors of primary CMYK colors and pale colors of cyan (C) and magenta (M) of the primary colors. A target gray line to connect white to black for color separation is set in predetermined color space, the combination of color materials of 3 colors are obtained to realize a color on the target gray line, color material amounts of the primary CMYK colors are determined to realize the color on the target gray line, and a total color material amount is determined to realize the target gray line. Regarding a color which cannot be realized by a combination of primary Y color and pale C and M colors to realize the color on the target gray line, respective color material amounts of the primary CMYK and pale colors are determined based on the total color material amount and the color material amounts of the primary 4 colors.

18 Claims, 30 Drawing Sheets

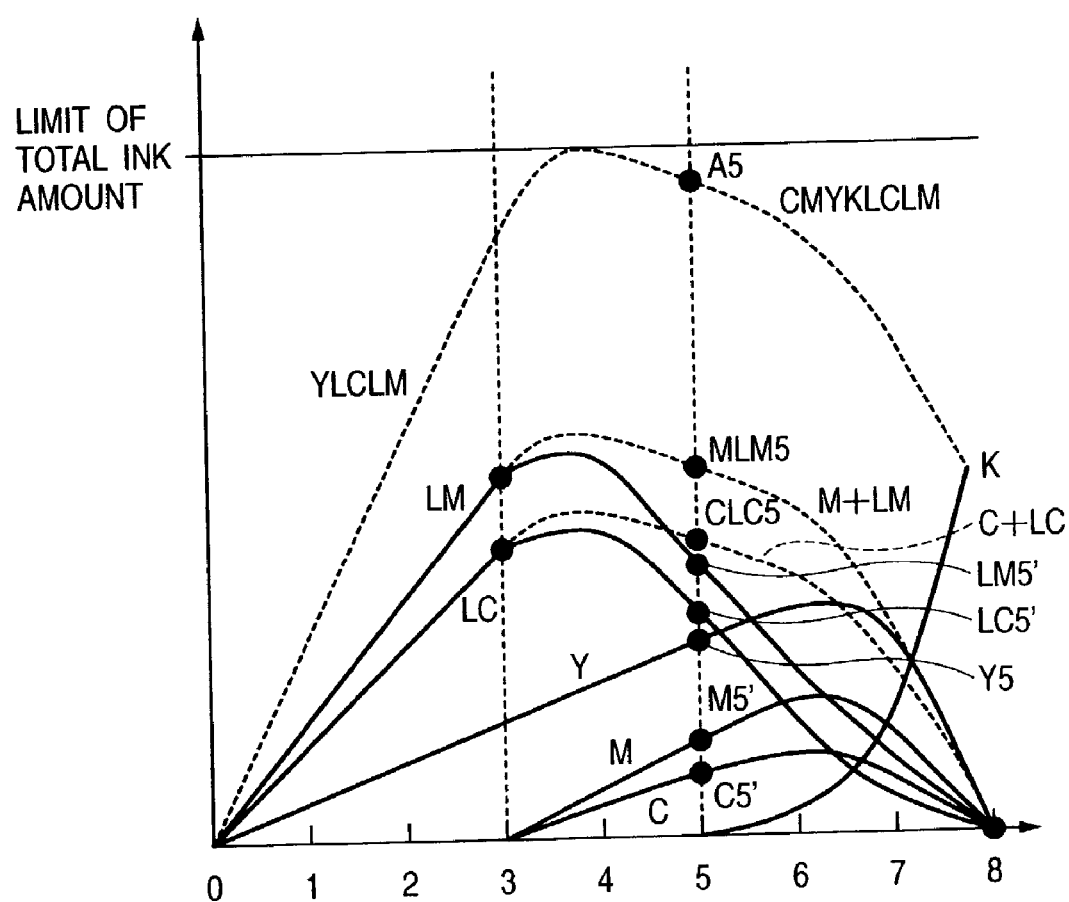

COLOR IMAGE PROCESSING METHOD AND APPARATUS

FIELD OF THE INVENTION

The present invention relates to color image processing method and apparatus for processing image data to be outputted to an image forming apparatus such as a color printer which forms a color image.

BACKGROUND OF THE INVENTION

Conventionally, in a color printer or the like, processing of separating image signals in RGB colors to color components of color material such as ink used in the color printer (hereinbelow referred to as "ink color separation processing") is realized by a construction as shown in FIG. 30. In FIG. 30, reference numeral 1601 denotes a luminance/density converter which generates CMY signals as density signals from the RGB signals as luminance signals; numeral 1602 denotes a UCR/BG processor which performs under color removal processing based on the CMY signals inputted from the luminance/density converter 1601 to generate a black (K) signal and outputs C', M', Y' and K' signals; numeral 1603 denotes a BG amount (under color addition amount) setting unit; and numeral 1604 denotes a UCR amount setting unit.

Next, operations of the respective elements will be described. The luminance/density converter 1601 converts the input luminance information (8-bit data) R', G' and B' into CMY signals based on the following expressions.

$$C = -\alpha \log(R'/255) \quad (1)$$

$$M = -\alpha \log(G'/255) \quad (2)$$

$$Y = -\alpha \log(B'/255) \quad (3)$$

($\alpha$: an arbitrary real number)

Next, the CMY data are converted based on a value $\beta(\text{Min}(C,M,Y),\mu)$ set in the BG amount setting unit 1603 and a UCR coefficient $\mu$ (%) set in the UCR amount setting unit 1604, to $$C' = C - (\mu/100) \times \text{Min}(C, M, Y) \quad (4)$$

$$M' = M - (\mu/100) \times \text{Min}(C, M, Y) \quad (5)$$

$$Y' = Y - (\mu/100) \times \text{Min}(C, M, Y) \quad (6)$$

$$K' = \beta(\text{Min}(C, M, Y), \mu) \times (\mu/100) \times \text{Min}(C, M, Y) \quad (7)$$

Note that Min(C,M,Y) indicates a minimum value of the CMY, and $\beta(\text{Min}(C, M, Y), \mu)$ is a real number which is changed based on Min(C, M, Y) and $\mu$. The addition of black (K) ink is set by this value.

As the UCR amount and BG amount greatly influence the color reproduction range of the color printer and graininess of printer in correspondence with addition of black (K) ink i.e. under color, they are very important parameters for the color printer.

However, in the conventional art, the UCR amount is uniformly set based on the product of the UCR coefficient $\mu$ and Min(C,M,Y), and the ink amount of gray line always has a constant CMY ratio. Accordingly, the color tone of gray line differs depending on characteristics of respective ink and print medium.

SUMMARY OF THE INVENTION

The present invention has been made in consideration of the above conventional art, and has its object to provide color image processing method and apparatus which set a target gray line and realize the color of the target gray line.

In order to attain the above described object, a color image processing apparatus of the present invention comprises the structure as follows.

A color image processing apparatus for performing color separation to separate image data colors into primary four color-material colors and pale color-material colors of predetermined ones of the primary color-material colors, comprises: setting means for setting a target gray line connecting white to black for the color separation in predetermined color space; three color gray generation means for obtaining a combination of three color materials to realize a color on the target gray line; four color separation processing means for determining amounts of the primary four color materials to realize the color on the target gray line; total color material amount determination means for determining a total color material amount to realize the target gray line; and color-material amount determination means for, regarding a color which cannot be realized by the combination of primary Y color and the pale color-material colors to realize the color on the target gray line, determining respective color material amounts of the color materials based on the total color material amount and the color material amounts of the primary four colors.

In order to attain the above described object, a color image processing method of the present invention comprises the steps as follows.

A color image processing method for performing color separation to separate image data colors into primary four color-material colors and pale color-material colors of predetermined ones of the primary color-material colors, comprising: a setting step of setting a target gray line connecting white to black for the color separation in predetermined color space; a three color gray generation step of obtaining a combination of three color materials to realize a color on the target gray line; a four color separation processing step of determining amounts of the primary four color materials to realize the color on the target gray line; a total color material amount determination step of determining a total color material amount to realize the target gray line; and a color-material amount determination step of, regarding a color which cannot be realized by the combination of primary Y color and the pale color-material colors to realize the color on the target gray line, determining respective color material amounts of the color materials based on the total color material amount and the color material amounts of the primary four colors.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 19 depicts a graph showing respective C, M, Y, K, LC and LM ink amounts as results of 6 color (density) separation processing according to the embodiment;

DETAILED DESCRIPTION OF THE PREFERRED EMBODIMENTS

Preferred embodiments of the present invention will now be described in detail in accordance with the accompanying drawings.

[First Embodiment]

Figure 1:
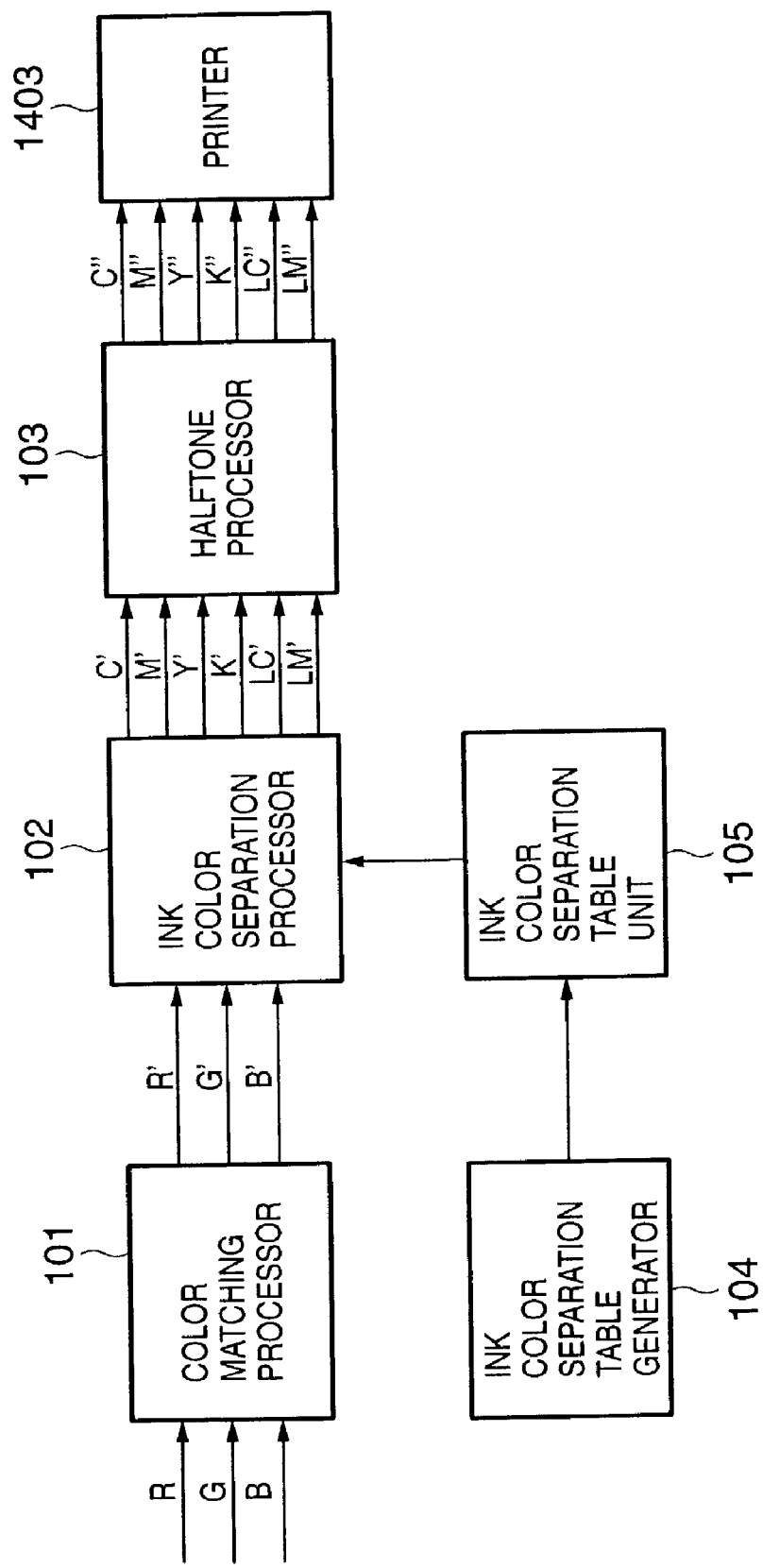
FIG. 1 is a block diagram showing a functional construction of image processing apparatus according to a first embodiment of the present invention.

FIG. 1 is a block diagram showing color separation processing from luminance signals to ink color signals (density signals) in an image processing apparatus according to a first embodiment of the present invention.

In FIG. 1, reference numeral 101 denotes a color matching processor which performs color matching between reproduction characteristics of input image data (RGB) and color printer colors for formation of color image based on the image data; numeral 102 denotes an ink color separation processor which converts R'G'B' multivalue data from the color matching processor 101 into data corresponding to color material colors, C' (cyan), M' (magenta), Y' (yellow), K' (black), LC' (pale cyan) and LM' (pale magenta), used in a color printer 1403 as a color image formation unit; numeral 103 denotes a halftone processor which converts the respective multivalue data C', M', Y', K', LC' and LM' from the ink color separation processor 102 into signals of tone levels for representation by the color printer 1403; numeral 105 denotes an ink color separation table unit which provides a look-up tale (LUT) for execution of interpolation processing in the ink color separation processor 102; and numeral 104 denotes an ink color separation table generator which generates the LUT held in the ink color separation table unit 105.

Figure 2:
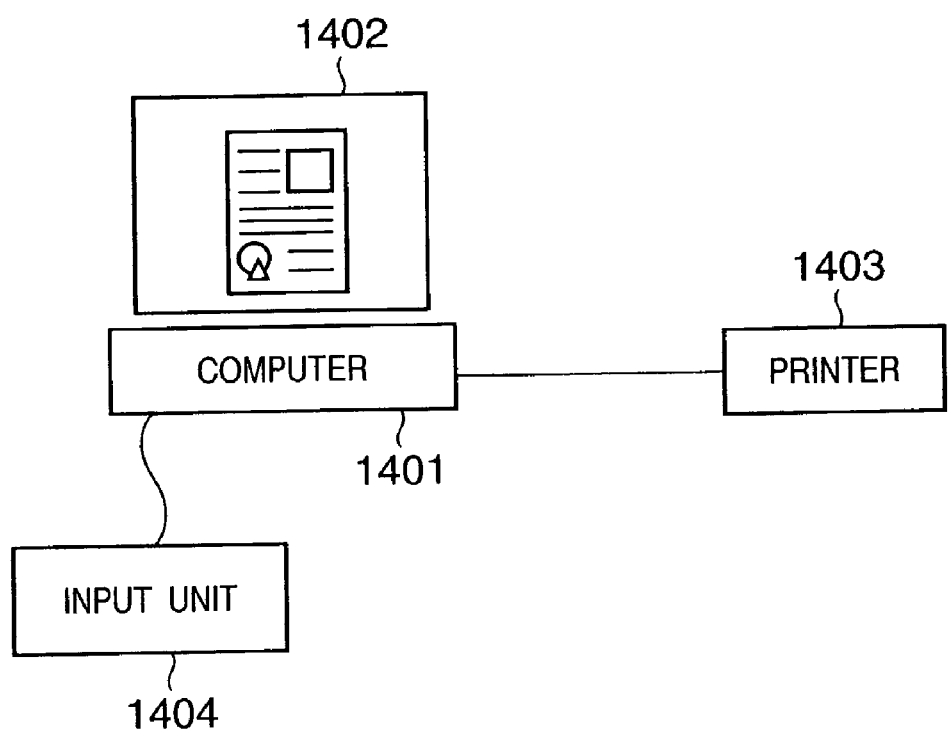
FIG. 2 is a block diagram showing a configuration of image formation system according to the first embodiment.

FIG. 2 shows a configuration of image forming system applied to the present embodiment.

In FIG. 2, numeral 1401 denotes a computer which holds input image data, having a function as the image processing apparatus shown in FIG. 1; and numeral 1402 denotes a monitor which displays the image data held by the computer 1401 or UI or the like for various operations by a user. The color printer 1403 prints a color image based on the image data sent from the computer 1401. Numeral 1404 denotes an input unit which is used for inputting various data and commands and the like to the computer 1401. The input unit 1404 has a keyboard, a mouse and the like.

Next, the flow of data in the system configuration in FIG. 2 and the flow of image signals in FIG. 1 will be described.

The image data held by the computer 1401 in FIG. 2 is sent via a cable or network (not shown) or radio communication to the color printer 1403 for printing. At this time, the color matching processor 101 (FIG. 1) performs color matching processing on the image data in correspondence with the color reproduction characteristic of the monitor 1402 used by the user, and outputs the processed R'G'B' data. The color-matching processed R'G'B' data are sent to the ink color separation processor 102 and separated into ink colors by interpolation processing based on previously-generated table data of the ink color separation table unit 105. The respective multivalue data C', M', Y', K', LC' and LM', separated into ink colors, are sent to the halftone processor 103, converted to signals (C", M", Y", K", LC" and LM") of reproducible tone levels for the color printer 1403, and sent to the color printer 1403 and print-outputted.

Next, the generation of the table data stored in the ink color separation table unit 105, which is previously generated by the ink color separation generator 104, will be described in detail with reference to FIG. 3 and subsequent figures.

Figure 3:
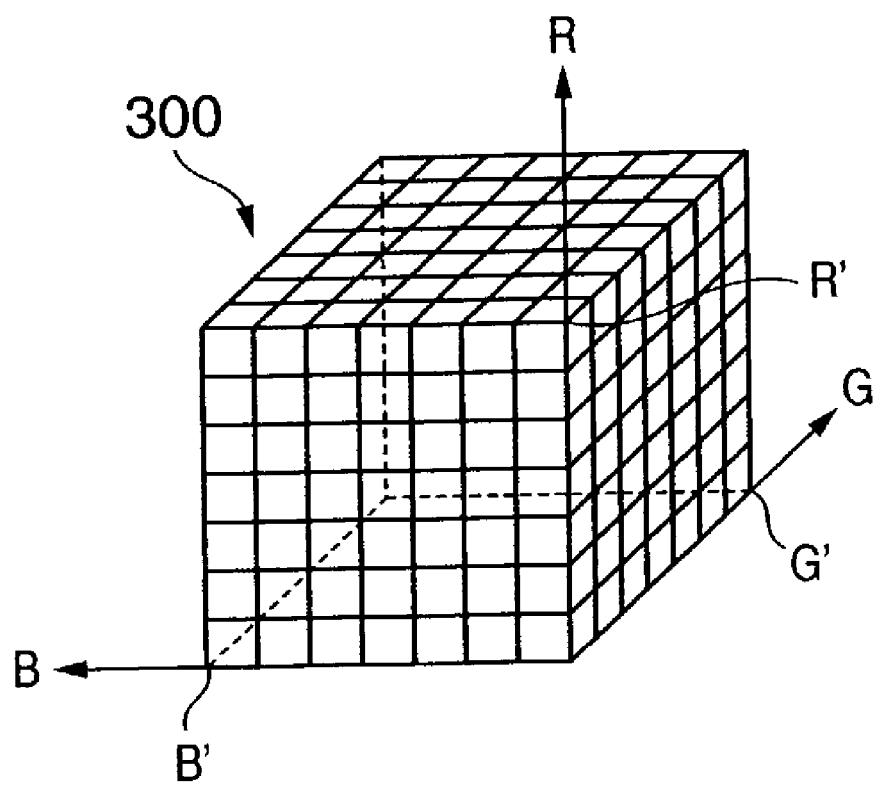
FIG. 3 depicts an explanatory view of generation of look-up table of ink color separation table unit according to the embodiment, showing RGB color space.

FIG. 3 depicts a data structure of the look-up table (LUT) of the ink color separation table unit 105 and shows color space of input RGB signals.

As shown in FIG. 3, in correspondence with input data R'G'B', data corresponding to grid points distributed in grid form in a regular hexahedron 300 on RGB three-dimensional color space are stored as table vales. The ink color separation processor 102 generates density data by referring to the table based on the input R'G'B' data. If the input R'G'B' data do not exist on the grid points of the ink color separation table unit 105, interpolation processing is performed by using nearby grid point data, and density signals as results of interpolation processing are outputted. The interpolation includes tetrahedral interpolation, cubic interpolation and the like. Since the generation of ink color separation table and image processing according to the present embodiment do not depend on a particular interpolation method, any interpolation method may be employed.

Figure 4:
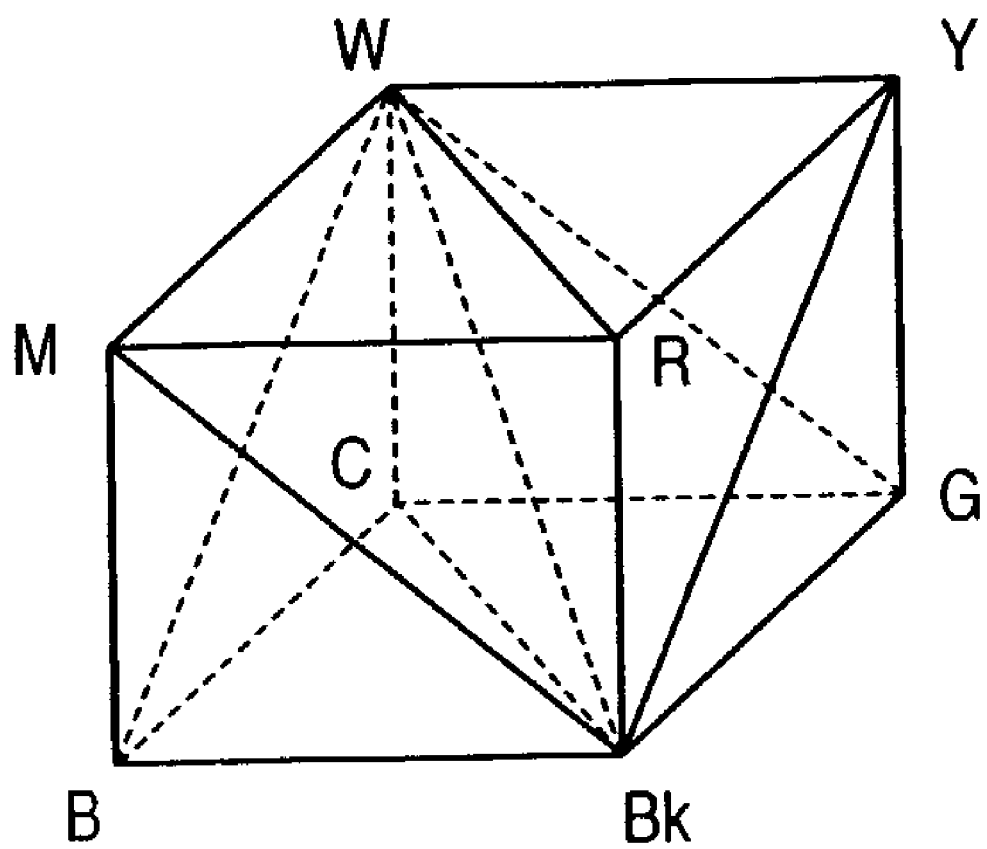
FIG. 4 depicts an explanatory view of generation of the ink color separation table according to the embodiment, showing division of input regular hexahedron in FIG. 3 into 6 tetrahedral geometries.

FIG. 4 depicts an explanatory view of generation of the ink color separation table according to the present embodiment, in which lines connecting 8 vertexes, W, C, M, Y, R, G, B and Bk, of the hexahedron 300, as W-C, W-M, W-Y, W-R, W-G, B-Bk and W-Bk lines, are indicated by solid or dotted lines. In a case where the number of bits of input data in the ink color separation processor 102 is "8", the respective vertexes W, C, M, Y, R, G, B, Bk have the following coordinates.

W=(R, G, B)=(255, 255, 255) indicates the color of print paper (white) used in printing by the color printer 1403.
C=(0, 255, 255) indicates cyan primary color.
M=(255, 0, 255) indicates magenta primary color.
Y=(255, 255, 0) indicates yellow primary color.
R=(255, 0, 0) indicates red primary color.
G=(0, 255, 0) indicates green primary color.
B=(0, 0, 255) indicates blue primary color.
Bk=(0, 0, 0) indicates black, i.e., the darkest point of the printer.

The generation of table data by the ink color separation table generator 104 according to the present embodiment is made by generating ink color separation tables of W-C, W-M, W0-Y, W-R, W-G, B-Bk and W-Bk lines and then obtaining ink colors corresponding to inside grid points by internal interpolation processing. Thus all the table data are generated.

Figure 5:
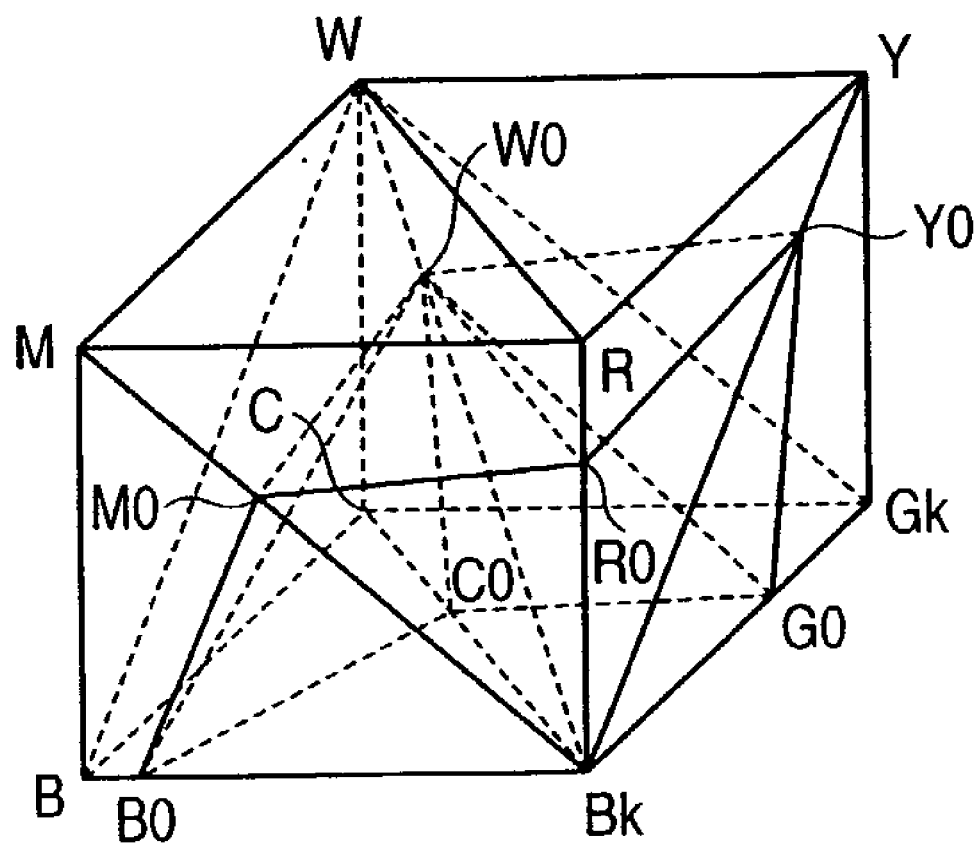
FIG. 5 depicts an explanatory view of under color addition point in the embodiment.

FIG. 5 depicts an explanatory view of under color addition point in the embodiment, explaining continuous under color addition point control on three-dimensional space by 7 points on the W-Bk, W-C, W-M, W-Y, W-R, W-G and B-Bk lines.

Figure 6:
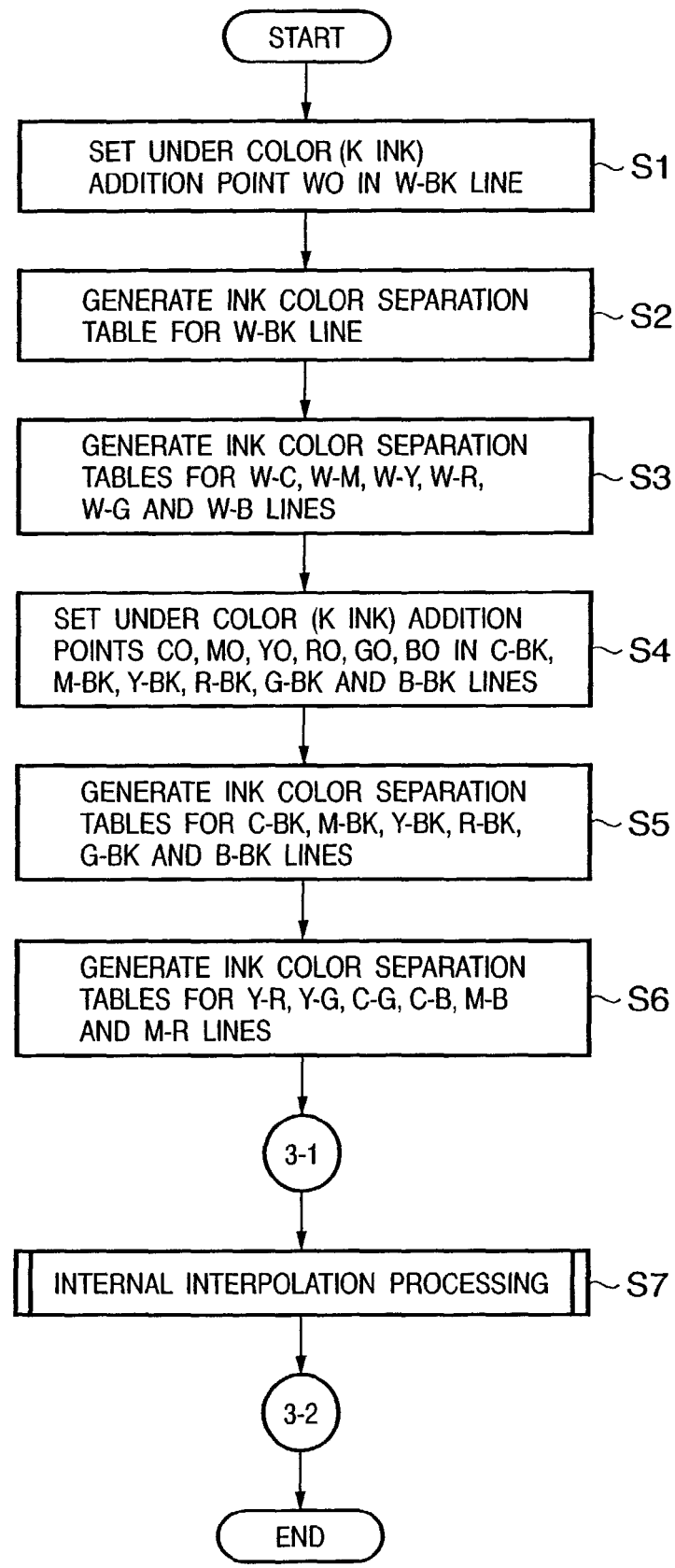
FIG. 6 is a flowchart showing table generation processing in the ink color separation table generator according to the embodiment.

FIG. 6 is a flowchart showing the table generation processing in the ink color separation table generator 104.

In FIG. 6, when generation of table data to be downloaded to the ink color separation table unit 105 is started, the process proceeds to step S1, at which an under color (K ink) addition point W0 is set on the W-Bk line in FIG. 5. This setting is made by displaying UI for under color addition point setting on the monitor 1402 in FIG. 2 and the user's designation of under color addition point in a white-to-black gray line, in consideration of color reproduction characteristics of the color printer 1403. Next, at step S2, based on the under color (K ink) addition point W0 in the W-Bk line set at step S1, an ink color separation table for the W-Bk line is generated. That is, an ink color separation table for the white-to-black gray line is generated. Next, at step S3, ink color separation tables for the W-C, W-M, W-Y, W-R, W-G, W-B lines are generated. That is, ink color separation tables are generated for white (W)-cyan (C), white (W)-magenta (M), white (W)-yellow (Y), white (W)-red, white (W)-green (G) and white (W)-blue (B) lines.

Next, at step S4, under color (K ink) addition points C0, M0, Y0, R0, G0 and B0 are set in the C-Bk, M-Bk, Y-Bk, R-Bk, G-Bk and B-Bk lines. That is, the setting is made by displaying under color addition UI for setting under color addition start points in these cyan (C)-black (Bk), magenta (M)-black (Bk), yellow (Y)-black (Bk), red (R)-black (Bk), green (G)-black (Bk) and blue (B)-black (Bk) lines on the monitor 1402 in FIG. 2 and designating under color addition points by the user. Then the process proceeds to step S5, at which ink color separation tables for the cyan-black, magenta-black, yellow-black, red-black, green-black and blue-black lines are generated. Then the process proceeds to step S6, ink color separation tables for the yellow(Y)-red(R), yellow(Y)-green(G), cyan(C)-green(G), cyan(C)-blue(B), magenta(M)-blue(B) and magenta(M)-red(R) lines are generated. Then the process proceeds to step S7 at which internal interpolation processing is further performed on the ink color separation tables generated at steps S1 to S5, thereby ink color separation tables corresponding to respective grid points of internal space of lines are generated.

In this manner, as the ink color separation tables, where optimum UCR amount and BG amount are set per color hue are generated, ink color separation tables where influence on graininess due to under color is suppressed as much as possible, can be generated while the color reproduction range of the color printer 1403 is set to a maximum range.

Next, the generation of white (W)-black (Bk) line ink color separation table (step S2) will be described in detail with reference to the flowchart of FIG. 7.

Figure 7:
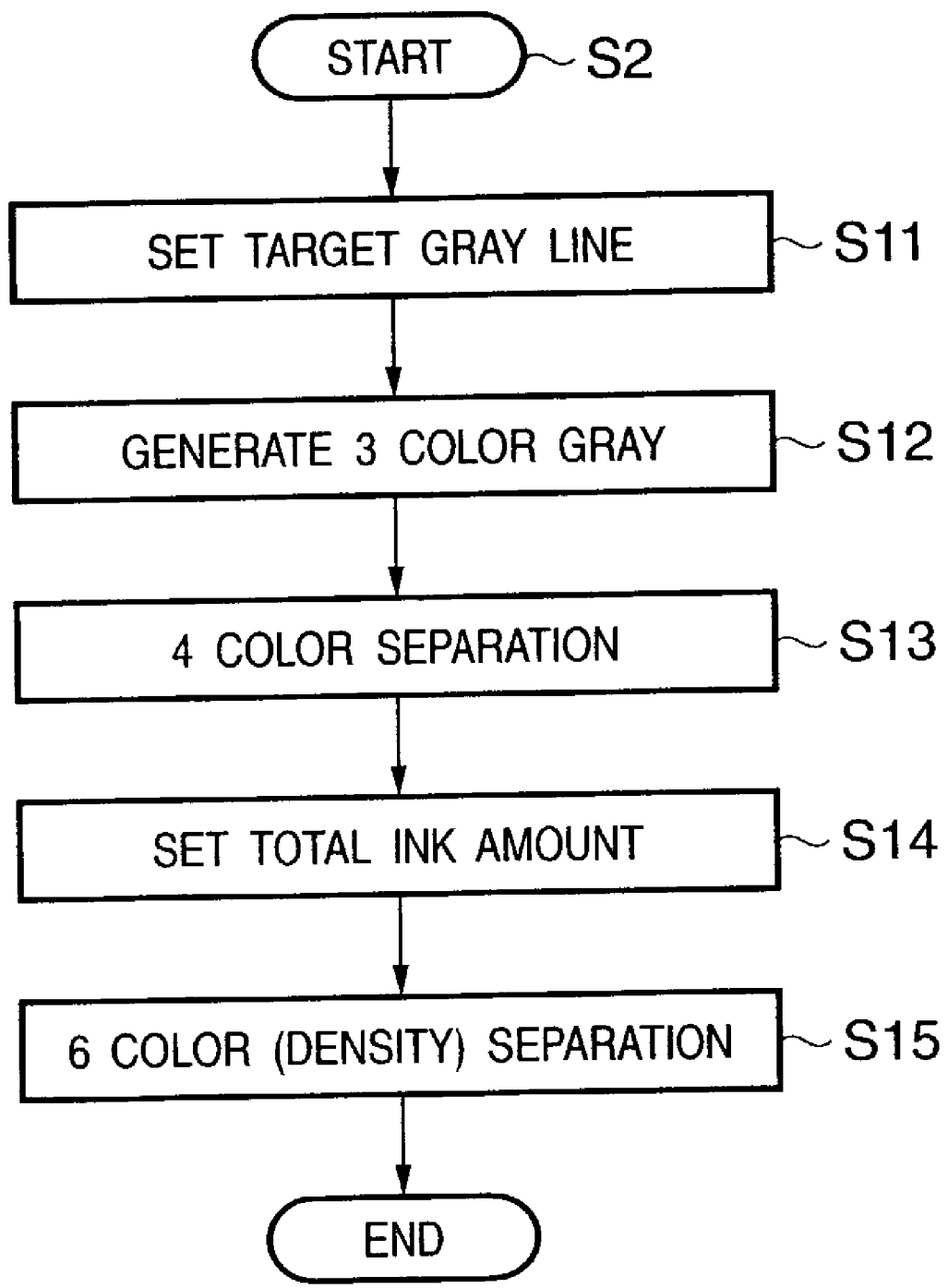
FIG. 7 is a flowchart showing processing for realizing ink color separation table generation processing for W-Bk line in FIG. 6 (step S2)
Figure 8:
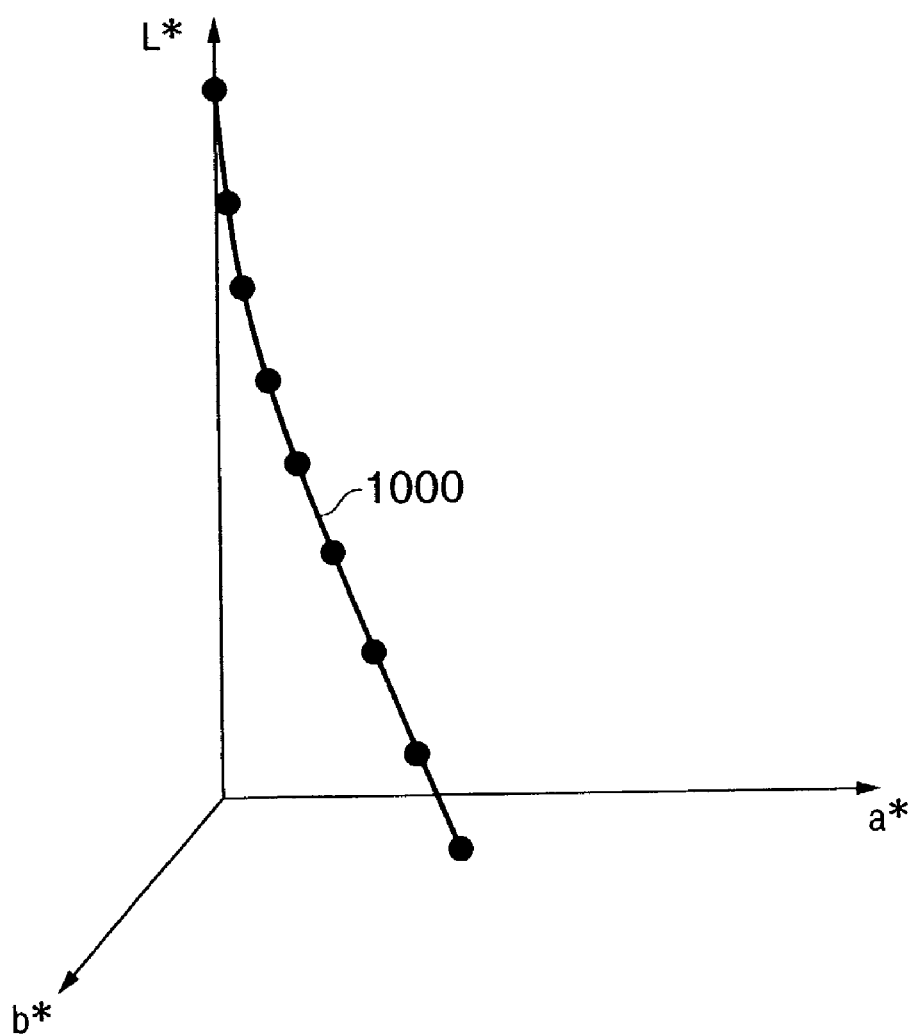
FIG. 8 depicts an example of target gray line plotted on three-dimensional L*a*b* color space.

In FIG. 7, first, at step S11, a target gray line 1000 is set. As shown in FIG. 8, in this embodiment, L*a*b* values are set for each grid point corresponding to the grid in FIG. 3. Note that in the figure, the grid points are indicated by black dots. The values between these grid points are obtained by interpolation processing based on the L*a*b* values set for the respective grid points, thereby data of the gray line 1000 are determined. Further, white (W) L*a*b* values are L*a*b* values of print medium (print sheet) in a state where no ink is applied, and black (Bk) L*a*b* values are L*a*b* values in a case where a largest amount of black ink is applied to the print medium. Next, the process proceeds to step S12, at which the combination of C, M and Y ink amounts for realizing the target gray line 1000 set at step S11 and the combination of Y, LC and LM ink amounts are obtained, thereby 3 color gray is generated. Next, at step S13, C, M, Y and K 4-color ink amounts for realize the target gray line 1000 set at step S12 are calculated. Then at step S14, a total ink amount on the grid realized by the 6 C, M, Y, K, LC and LM is set. Next, at step S15, color separation processing is performed on the 6 colors based on the 3 color gray obtained at step S12, the 4 color separation obtained at step S13 and the total ink amount set at step S14.

Next, the details of processes at steps S12 to S15 in FIG. 7 will be described.

The generation of the 3 color gray at step S12 in FIG. 7 will be described with reference to FIGS. 9 to 11.

Figure 9:
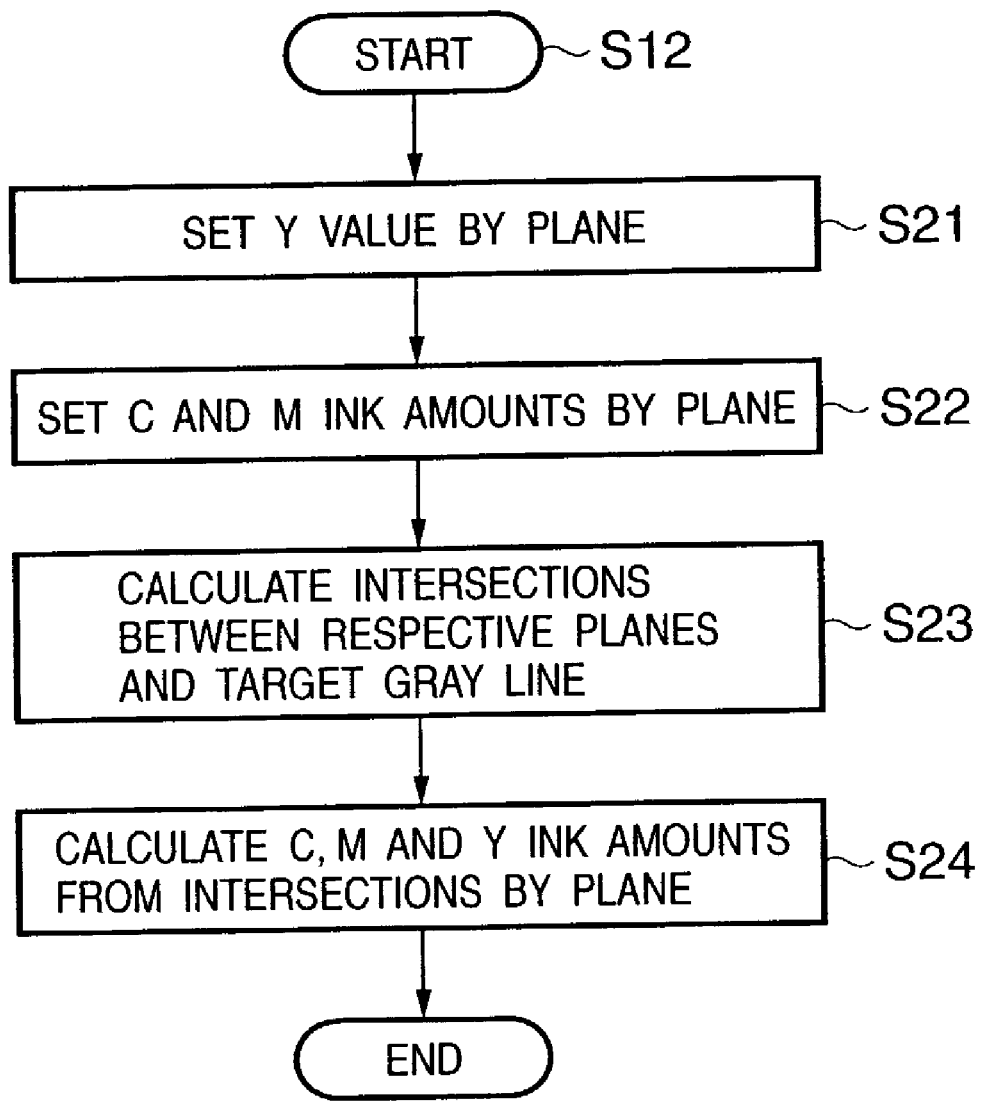
FIG. 9 is a flowchart showing 3 color gray generation processing at step S12 in FIG. 7.

FIG. 9 is a flowchart showing the 3-gray generation processing (S12).

In FIG. 9, first, at step S21, the value of Y is set by plane.

Figure 10:
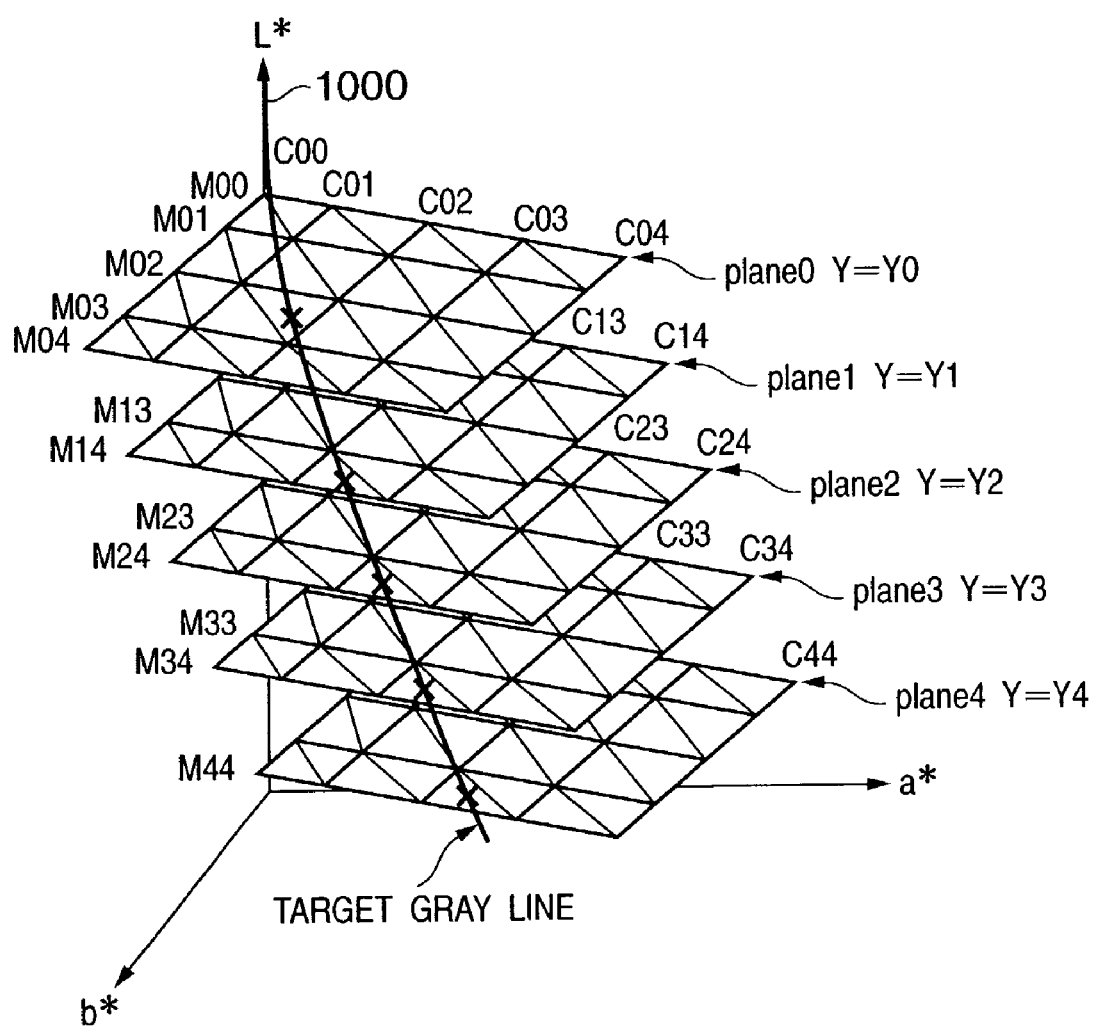
FIG. 10 depicts an explanatory view of the 3 color gray generation in FIG. 9, showing the result of color measurement plotted on three-dimensional L*a*b* color space, obtained by patch-printing based on C, M and Y ink amounts per plane and measuring the printed colors.

FIG. 10 is an explanatory view of setting of the value of Y by plane.

The values of Y for plane 0 (plane0) to plane 4 (plane4) are Y0, Y1, Y2, Y3 and Y4. Next, the process proceeds to step S22, at which C, M and Y ink amounts are set for each plane. In the example of FIG. 10, as the C ink amounts for the plane 0, C00, C0, C02, C03 or C04 are set, and as the M ink amounts, M00, M01, M02, M03 or M04 are set. The total 25 combinations of ink amounts are set. Similarly, the C and M ink amounts for the planes 1 to 4 are as follows.

Plane 1: (C10, C11, C12, C13, C14)×(M10, M11, M12, M13, M14)

Plane 2: (C20, C21, C22, C23, C24)×(M20, M21, M22, M23, M24)

Plane 3: (C30, C31, C32, C33, C34)×(M30, M31, M32, M33, M34)

Plane 4: (C40, C41, C42, C43, C44)×(M40, M41, M42, M43, M44)

FIG. 10 shows the result of color measurement plotted on three-dimensional L*a*b* color space obtained by patch printing based on C, M and Y ink amounts per plane and measuring the printed colors.

Next, the process proceeds to step S23, at which intersections between the respective planes and the target gray line 1000 are calculated. In this example, the intersections between the target gray line 1000 and the planes 0 to 4 are obtained. The intersections are obtained by forming a triangle by using near 3 points from 5×5 grid points in each plane and defining 32 planes from 32 triangles by plane, then obtaining triangles having the intersections between the target gray line 1000 and the planes. In FIG. 10, a mark "x" indicates the intersection between the target gray line 1000 and the plane. Next, the process proceeds to step S24, at which the C, M and Y ink amounts are calculated from the intersections between the respective planes and the target gray line 1000.

Next, the calculation will be described with reference to FIG. 11.

Figure 11:
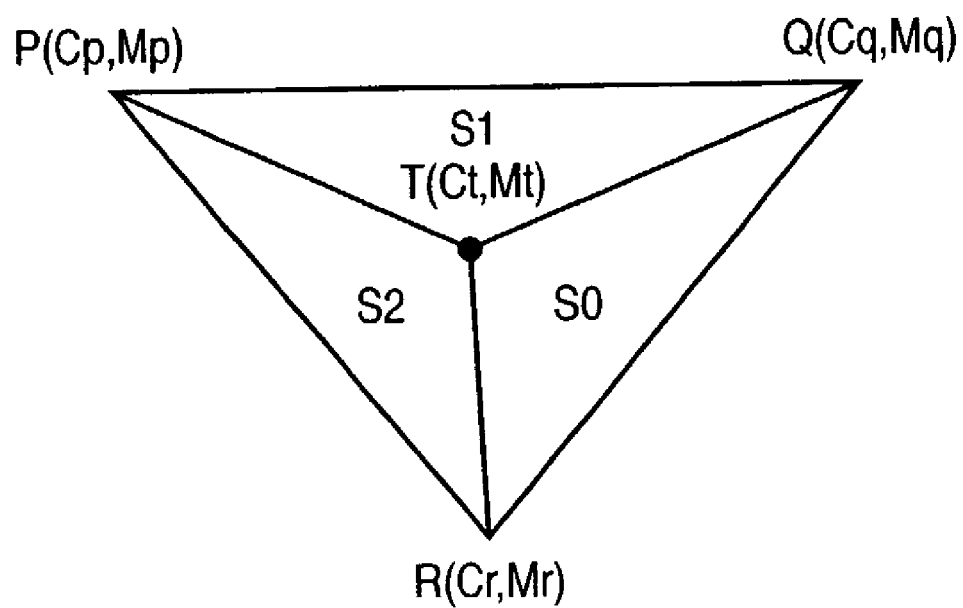
FIG. 11 depicts an explanatory view of calculation method of CMY ink amounts from intersections between the target gray line and plural planes.

In FIG. 11, a point T is an intersection between a plane defined by a triangle having vertexes P, Q and R in a plane, and the target gray line 1000. The (C, M) ink amounts at the vertex P are (Cp, Mp); the (C, M) ink amounts at the point Q, (Cq, Mq); and the (C, M) ink amounts at the point R, (Cr, Mr). Further, S0 is the area of triangle TRQ; S1, the area of triangle TPQ; and S2, the area of triangle TPR. The C and M ink amounts at the intersection T (Ct, Mt) are defined by the following expressions.

$$Ct=(S0 \times Cp+S1 \times Cr+S2 \times Cq)/(S0+S1+S2)$$

$$Mt=(S0 \times Mp+S1 \times Mr+S2 \times Mq)/(S0+S1+S2)$$

Further, the Y ink amount at the intersection T is the ink amount of Y set by plane.

As described above, the 3 color gray generation at step S12 in FIG. 7 is made by providing plural planes while setting C and M ink amounts crossing the fixed Y ink amount, calculating the intersections between the respective planes and the target gray line 1000, and calculating the C and M ink amounts from the intersections. Further, the calculation of 3 color gray by the Y, LC and LM ink is also obtained by performing the processing in the flowchart of FIG. 9 while replacing the C and M ink by the LC and LM ink.

Figure 12:
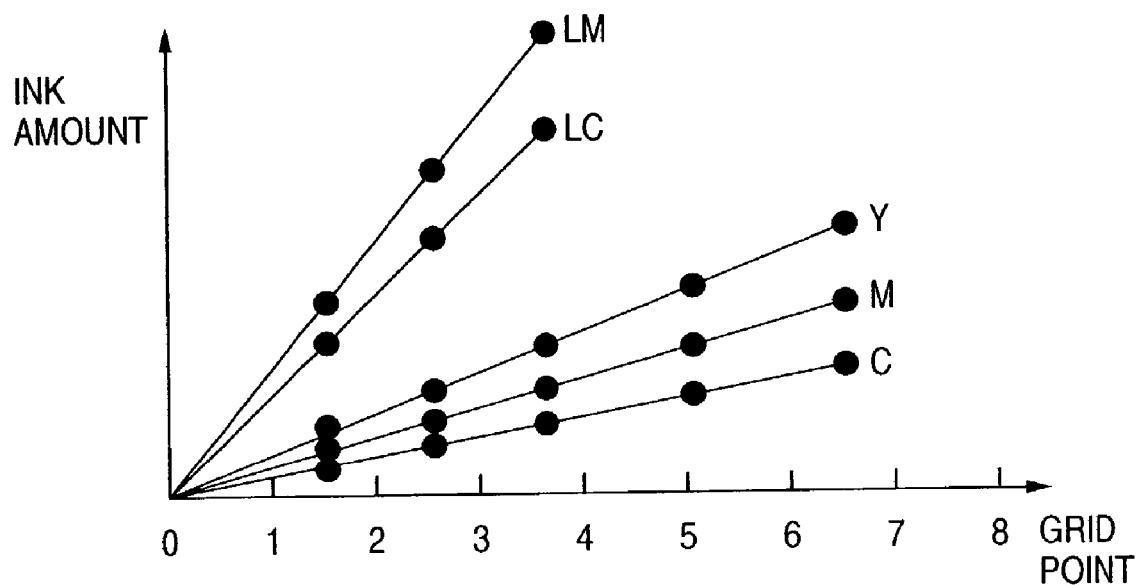
FIG. 12 depicts a graph showing a 3 color gray line generated by the 3 color gray generation processing with C, M and Y (step S12) in FIG. 7, and a 3 color gray line generated with Y, LC and LM.

FIG. 12 depicts a graph showing a 3 color gray line generated by the above processing with C, M and Y ink, and a gray line generated with Y, LC and LM ink.

As it is apparent from the figure, the Y ink amount at the gray level obtained by the above processing by using the C, M and Y ink is the same as the Y ink amount at the gray level obtained by using the L, LC and LM ink. Further, the combinations of these C, M, Y, LC and LM ink do not always correspond to the grid points. Accordingly, the respective C, M, Y, LC and LM ink amounts corresponding to the target gray line per grid point can be obtained by interpolation processing from the combination obtained in FIG. 12.

Figure 13:
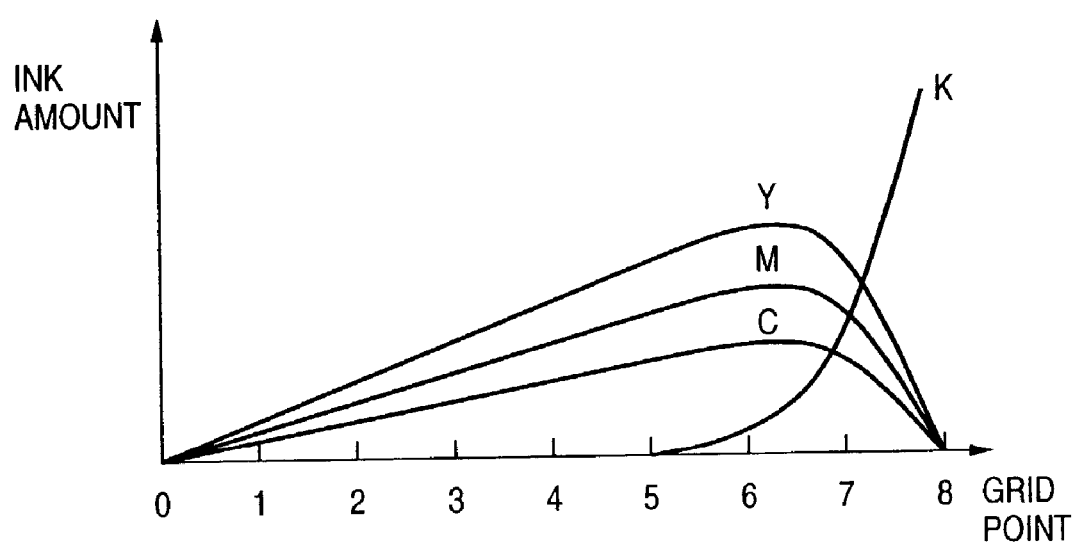
FIG. 13 depicts a graph showing an example of result of 4 color separation processing performed at step S13 in FIG. 7.

FIG. 13 depicts the result of 4 color separation processing performed at step S13 in FIG. 7. Note that the C, M and Y gray level from grid points 0 to 5 are values obtained at step S12, and the results of the 4 color separation processing are indicated by grid points 6 and 7.

The 4 color separation processing is made by patch-printing based on C, M, Y and K by 9 slices per color as 9×9×9×9=6561 patches and measuring the printed colors. The separation amounts of these 4 colors can be obtained by setting L*a*b* values and K value of the target gray line set for each grid point and obtaining the remaining CMY ink amounts by performing four-dimensional interpolation processing based on measurement data obtained from the CMYK 9×9×9×9=6561 patches. As the interpolation processing, tetrahedral interpolation processing, cubic interpolation processing can be employed.

Figure 14:
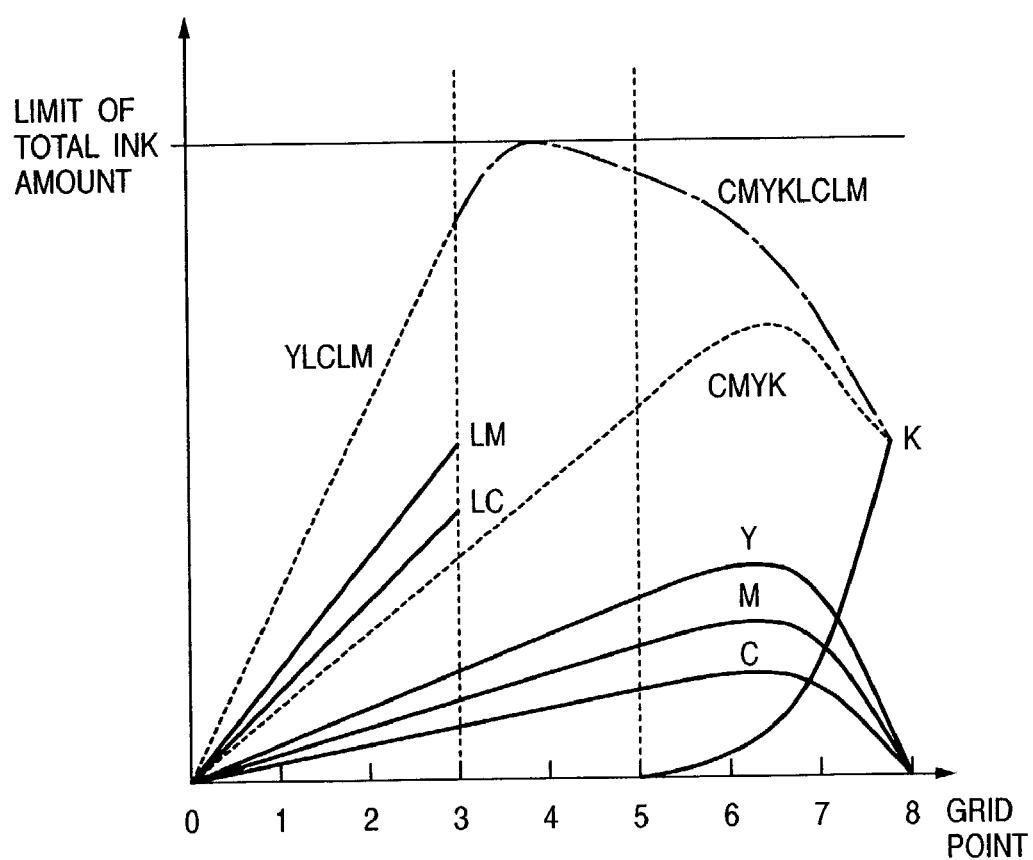
FIG. 14 depicts a graph showing a total ink amount line set at total ink-amount setting processing (step S14) in FIG. 7.

FIG. 14 shows an example of result of the above processing.

In FIG. 14, a dotted line YLCLM indicates a total amount of Y, LC and LM ink, and similarly, a dotted line CMYK, a total amount of C, M, Y and K ink. The total ink amount of the 6 colors, i.e., C, M, Y, K, LC and LM from grid points 3 to 8, is smoothly set by using the ink amounts by these two dotted lines as guide lines. At this time, the amount of 6 colors, C, M, Y, K, LC and LM (CMYKLCLM) ink must be greater than that of 4 colors, C, M, Y and K (CMYK).

Figure 15:
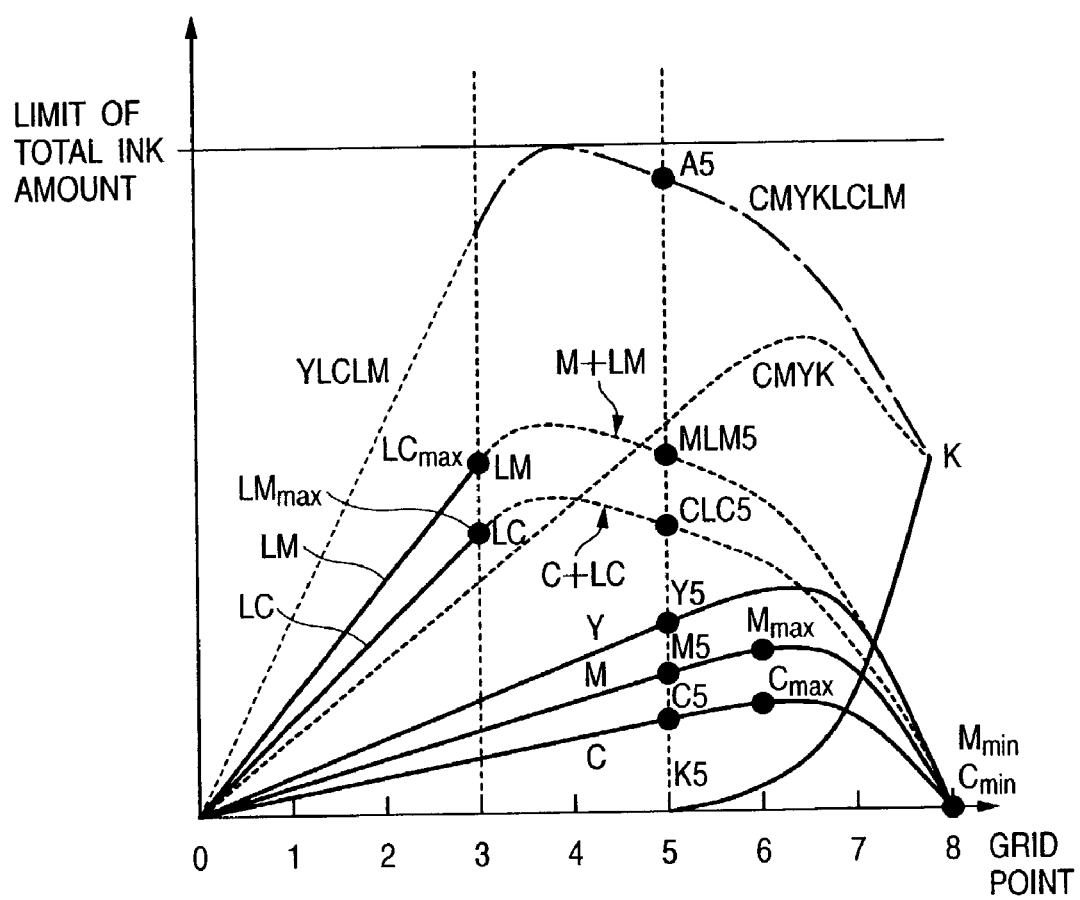
FIG. 15 depicts a graph particularly showing 6 color (density) separation processing at step S15 in FIG. 7.
Figure 16:
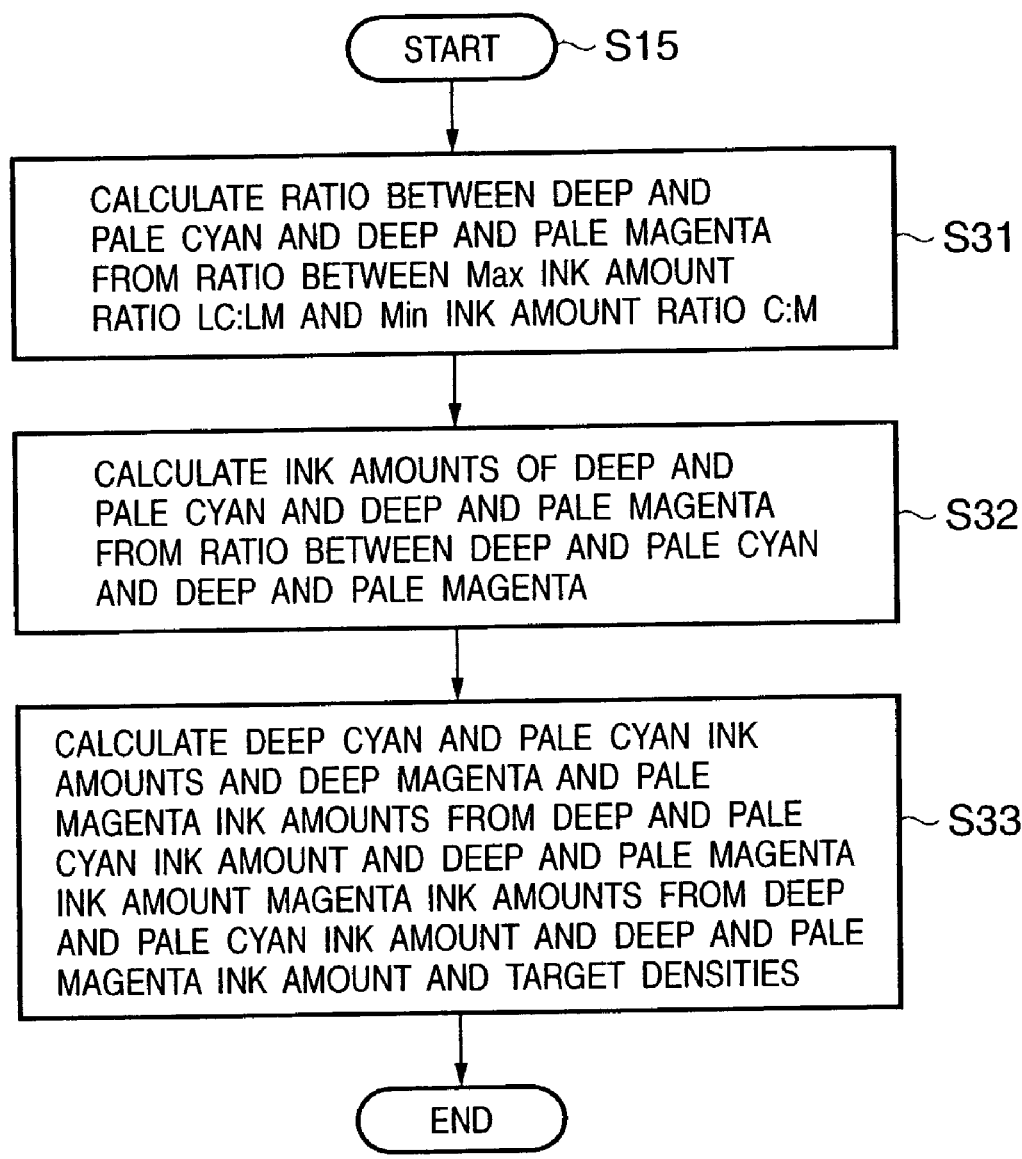
FIG. 16 is a flowchart showing the 6 color (density) separation processing at step S15 in FIG. 7.

FIG. 16 is a flowchart showing the 6 color (density) separation processing at step S15 in FIG. 7. FIG. 15 is a graph explaining the flowchart.

In FIG. 16, first, at step S31, the ratio between deep and pale cyan (C+LC) and deep and pale magenta (M+LM) is calculated from ratios between LC and LMmax and between C and Mmin.

In FIG. 15, the ratio between the deep and pale cyan (CLC) and deep and pale magenta (MLM) in grid point 5

(CLC5:MLM5) can be obtained by the following linear interpolation from LCmax:LMmax in grid point 3 and Cmax:Mmax in grid point 6.

$$CLC5/MLM5=(LCmax/LMmax+2\times Cmax/Mmax)/3$$

In this manner, the ratio between the deep and pale cyan and deep and pale magenta in the grid point 5 is obtained from LCmax:LMmax in the grid point 3 and Cmax:Mmax in the grid point 6. Similarly, the ratio between the deep and pale cyan and deep and pale magenta in grid point 7 can be obtained from Cmax:Mmax in the grid point 6 and Cmin:Mmin in grid point 8.

Next, the process proceeds to step S32, at which deep and pale cyan ink amount and deep and pale magenta ink amount are calculated from the ratios between deep and pale cyan and deep and pale magenta. In this example, the deep and pale cyan ink amount and the deep and pale magenta ink amount are calculated from the ratios between the deep and pale cyan and deep and pale magenta obtained at step S31.

As shown in FIG. 15, assuming that the CMYKLCLM ink amount in the grid point 5 is A5, the C ink amount, C5, the M ink amount, M5, Y ink amount, Y5, the deep and pale cyan (C+LC) ink amount, CLC5, and deep and pale magenta (M+LM) ink amount, MLM5, the following expressions hold.

$$CLC5=CLC5\times(A5-Y5)/(CLC5+MLM5)$$

$$MLM5=MLM5\times(A5-Y5)/(CLC5+MLM5)$$

Next, the process proceeds to step S33, at which the respective deep cyan ink amount, pale cyan ink amount, deep magenta ink amount and pale magenta ink amount are calculated from the deep and pale cyan ink amount and the deep and pale magenta ink amount and target densities.

The target densities for density separation are obtained from the C and M ink amounts obtained at steps S12 and S13 in FIG. 7. That is, the target densities of deep and pale cyan and deep and pale magenta in the grid point 5 in FIG. 15 are respectively D(C5) and C(M5). Note that D(x) indicates a density of ink amount x. Accordingly, in the grid point 5, cyan density separation is determined based on the deep and pale cyan ink amount CLC5 and the target density D(C5), and magenta density separation is determined based on the deep and pale magenta ink amount MLM5 and the target density D(M5).

Figure 17:
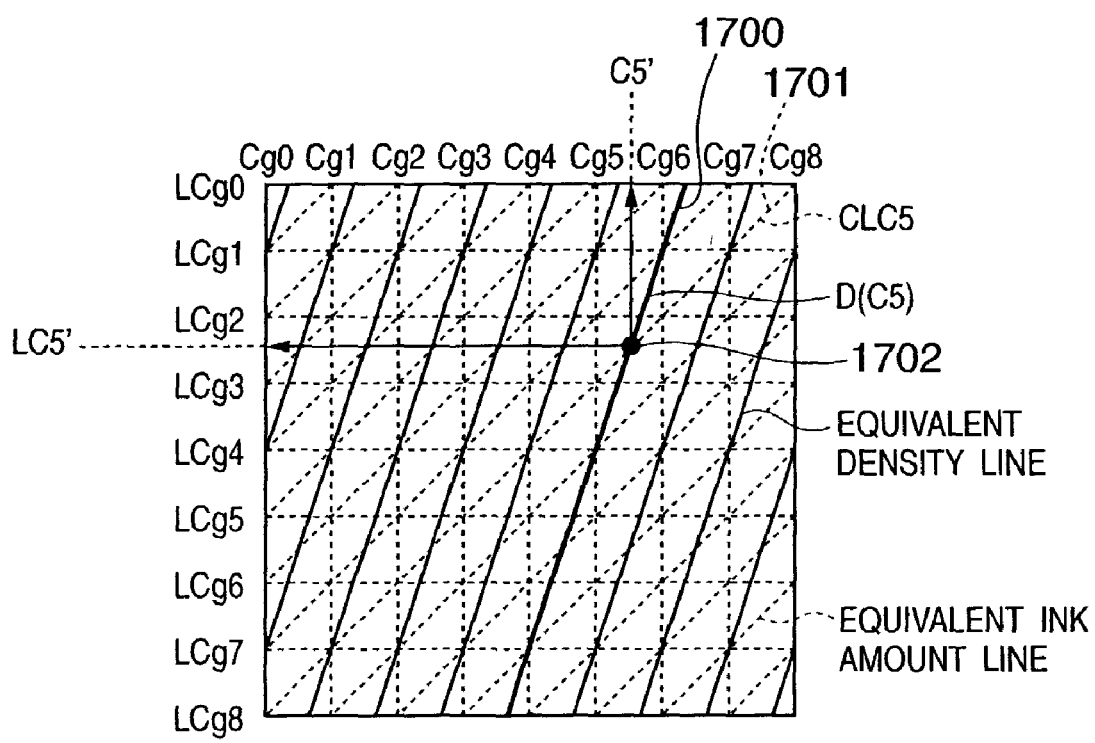
FIG. 17 depicts an explanatory view of execution of density separation from deep and pale ink amounts and a target density and determination of deep ink (C) amount and pale ink (LC) amount.

FIG. 17 depicts an explanatory view of execution of density separation from deep and pale ink amounts and a target density and determination of deep ink amount and pale ink amount.

In FIG. 17, numerals Cg0, Cg1, . . . , Cg8 denote deep cyan (C) ink amounts in grid points g0, g1, . . . , g8 in the vertical direction; LCg0, LCg1, . . . , LCg8, pale cyan (LC) ink amounts in grid points g0, g1, . . . , g8 in the horizontal direction. Diagonal solid lines are equivalent density lines plotted as results of measurement of densities of patch-printing using deep and pale cyan ink amounts corresponding to the above 9×9=81 grid points. A particularly bold line 1700 indicates the target density D(C5). Further, diagonal dotted lines are equivalent ink amount lines of total deep and pale ink amount. A bold line 1701 indicates the ink amount CLC5. Accordingly, the cyan density separation in the grid point 5 is obtained from an intersection 1702 between the deep and pale ink amount CLC5 and the target density D(C5). The deep cyan ink amount is denoted by C5', and the pale cyan ink amount, by LC5'.

Figure 18:
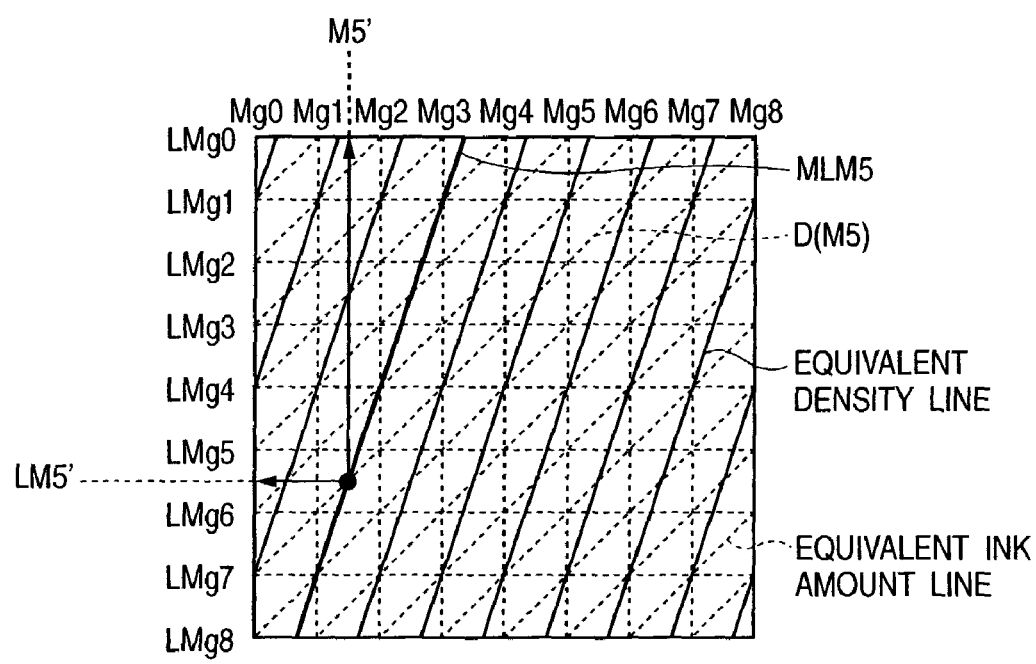
FIG. 18 depicts an explanatory view of density separation from deep magenta and pale magenta ink amounts and a target density and determination of deep magenta ink (M) amount and pale magenta ink (LM) amount.

Similarly, the magenta density separation is made as shown in FIG. 18. The deep magenta (M) ink amount denoted by M5' and the pale magenta (LM) ink amount denoted by LM5' are determined from the intersection between the deep and pale magenta ink amount MLM5 and the target density D(M5). Thus, 6 color (density) separation processing at step S15 in FIG. 7 is completed.

FIG. 19 depicts a graph showing respective C, M, Y, K, LC and LM ink amounts as results of the 6 color (density) separation processing.

Next, the internal interpolation processing at step S6 in FIG. 6 will be described.

FIGS. 20A to 20F depict the interpolation processing.

The internal interpolation processing is made by division into 6 tetrahedral geometries each surface has a triangular shape as shown in FIGS. 20A to 20F and execution of interpolation processing by tetrahedral geometry.

Figure 20A:
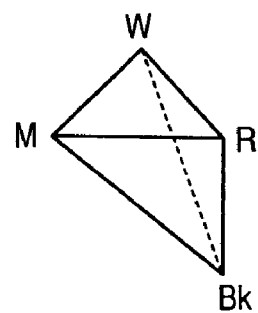
FIGS. 20A to 20F show a tetrahedral geometry (FIG. 20A) having vertexes W, R, M and Bk, a tetrahedral geometry (FIG. 20B) having vertexes W, M, B and Bk, a tetrahedral geometry (FIG. 20C) having vertexes W, C, B and Bk, a tetrahedral geometry (FIG. 20D) having vertexes W, Y, R and Bk, a tetrahedral geometry (FIG. 20E) having vertexes W, Y, G and Bk, and a tetrahedral geometry (FIG. 20F) having vertexes W, C, G and Bk.
Figure 20D:
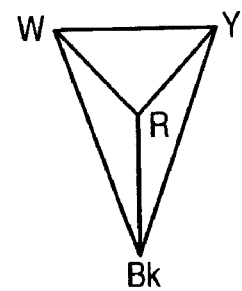
Figure 20B:
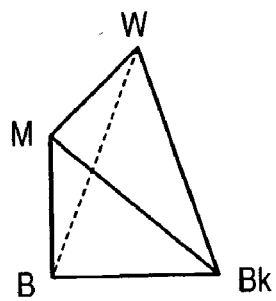
Figure 20E:
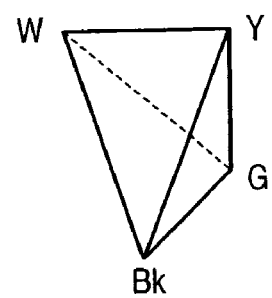
Figure 20C:
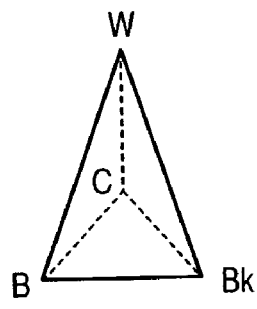
Figure 20F:
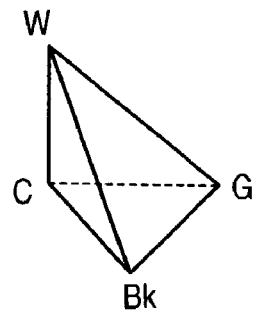

FIG. 20A shows a tetrahedral geometry including vertexes W, R, M and Bk; FIG. 20B, a tetrahedral geometry having vertexes W, M, B and Bk; FIG. 20C, a tetrahedral geometry having vertexes W, C, B and Bk; FIG. 20D, a tetrahedral geometry having vertexes W, Y, R and Bk; FIG. 20E, a tetrahedral geometry having vertexes W, Y, G and Bk; and FIG. 20F, a tetrahedral geometry having vertexes W, C, G and Bk.

Figure 21:
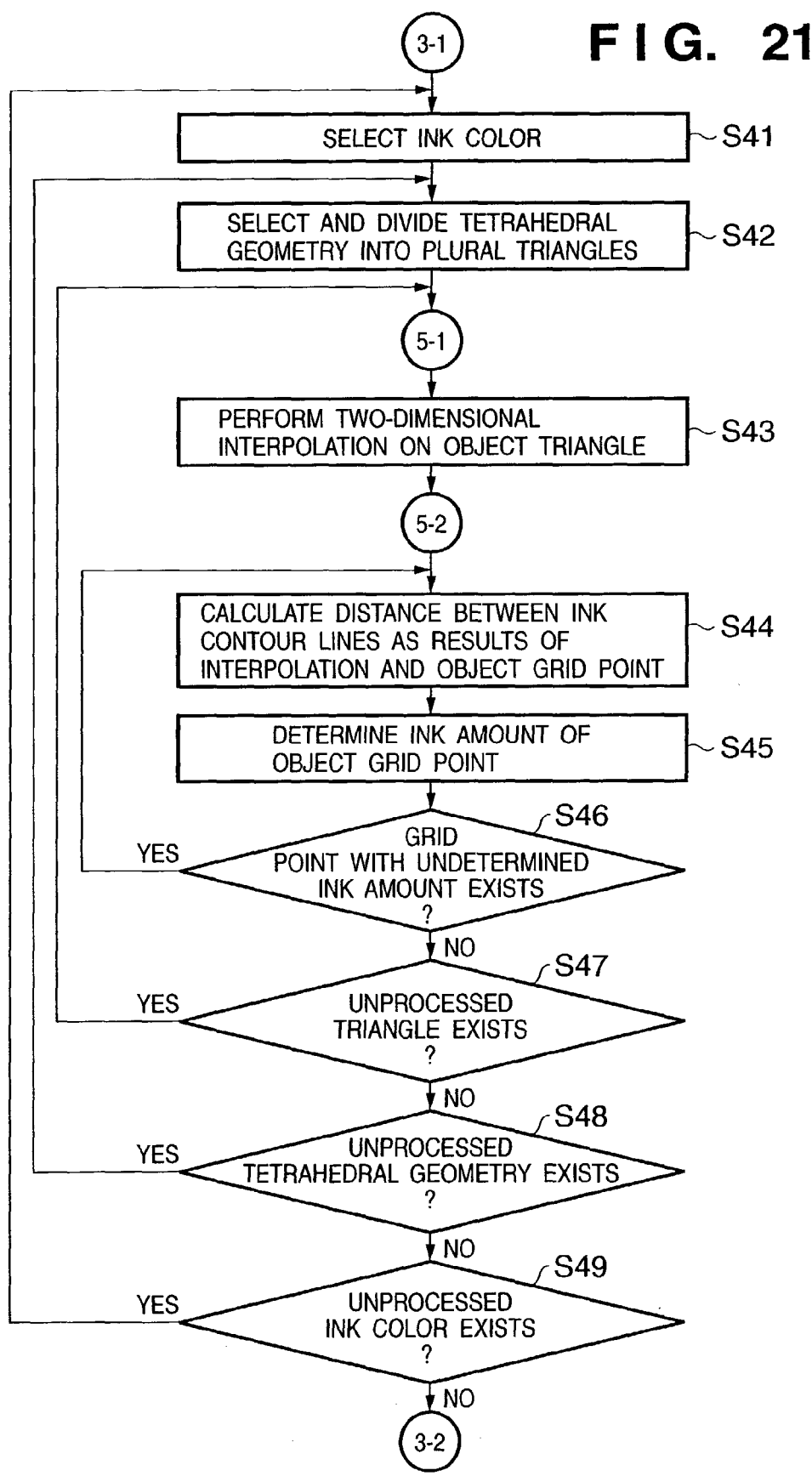
FIG. 21 is a flowchart showing internal interpolation processing (step S6) in FIG. 6 in detail.

FIG. 21 is a flowchart showing the internal interpolation processing at step S6 in FIG. 6 in detail.

In FIG. 21, first, at step S41, an ink color is selected. More specifically, one of the ink colors, cyan, magenta, yellow, black, pale cyan and pale magenta, is sequentially selected for determination of ink amount corresponding to each grid point in the subsequent processing steps.

Next, at step S42, a tetrahedral geometry is selected and divided into plural triangles. In this embodiment, one of the 6 tetrahedral geometries in FIGS. 20A to 20F is sequentially selected and divided into plural triangles. The division is made by dividing e.g. the tetrahedral geometry in FIG. 20A into triangles WMR, WMBk, WRBk and MRBk constructing the tetrahedral geometry, then dividing the inside of the tetrahedral geometry WMRBk into plural triangles in correspondence with the number of grid points in a plane parallel to the triangle WRM.

Next, the process proceeds to step S43, at which two-dimensional interpolation processing is performed on each object triangle.

The two-dimensional interpolation processing on the respective triangles will be described in detail with reference to FIG. 22 and the subsequent figures.

At step S44, the distances between ink contour lines as results of interpolation processing and each grid point are calculated. In this embodiment, contour lines as shown in FIG. 22 generated by the two-dimensional interpolation processing on the respective triangles (step S43) and the grid points corresponding to the ink color separation table unit 105 are calculated. Next, at step S45, an ink amount for the object grid point is determined. In this embodiment, the distances between the ink contour lines as results of interpolation processing and the grid point are calculated, and the minimum distance is determined as the ink amount for the object grid point. The process proceeds to step S46, at which it is determined whether or not a grid point with undetermined ink amount exists. If a grid point with undetermined ink amount exists, the process returns to step S44, at which the above processing at steps S44 and S45 is performed on the next grid point.

At step S46, if it is determined that ink amounts for all the grid points have been determined in the triangle selected at step S43, the process proceeds to step S47, at which it is determined whether or not an unprocessed triangle exists.

That is, it is determined whether or not the processing on all the triangles divided at step S42 has been completed. If an unprocessed triangle exists, the process returns to step S43 to repeat the above processing at steps S43 to S46.

Then, if it is determined at step S47 that the processing on all the triangles of the tetrahedral geometry selected at step S42 has been completed, the process proceeds to step S48, at which it is determined whether or not an unprocessed tetrahedral geometry exists. If an unprocessed tetrahedral geometry exists, the process returns to step S42 to repeat the above processing at steps S42 to S47.

If the processing on all the tetrahedral geometries has been completed, the process proceeds from step S48 to step S49, at which it is determined whether or not an unprocessed ink color exists. If an unprocessed ink color exists, the process returns to step S41 to repeat the above processing at steps S41 to S48. If the processing on all the ink colors has been completed, the process returns to (3–2) in FIG. 6.

Next, the details of the two-dimensional interpolation processing on the object triangle (step S43) will be described with reference to FIG. 22 and the subsequent figures.

Figure 22:
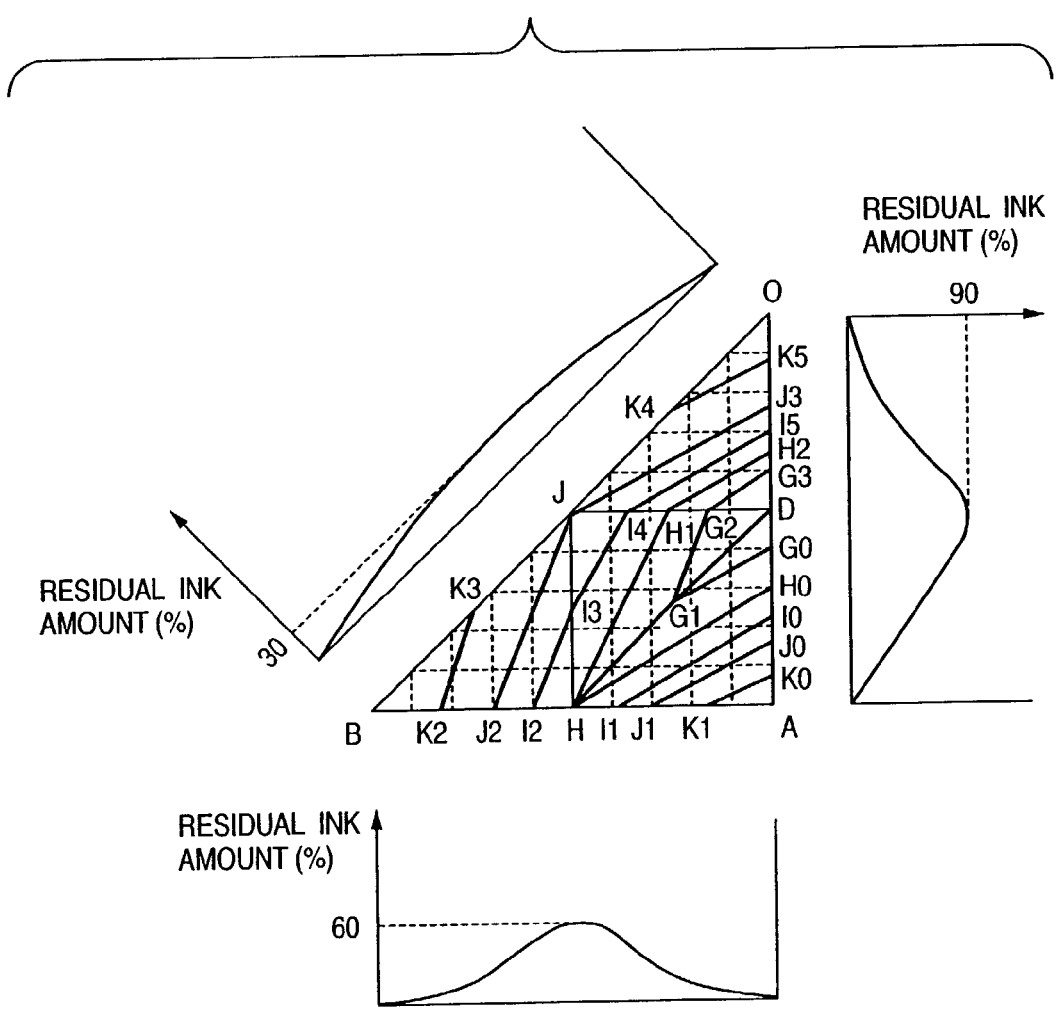
FIG. 22 depicts an explanatory view of ink contour lines as results of internal interpolation in a case where ink amounts of 3 sides of triangle are indicated by curves.

FIG. 22 shows ink contour lines as results of the internal interpolation in a case where ink amounts of 3 sides of a triangle are indicated by curves as shown in the figure. In FIG. 22, variation in ink amount of side OA is shown in a graph on the right side of the side OA where the peak ink amount is 90%. Further, variation in ink amount of side OB is shown in a graph on the upper-left side of the side OB where the peak ink amount is 30%. Further, variation in ink amount of side AB is shown in a graph below the side AB where the peak ink amount is 60%.

Figure 23:
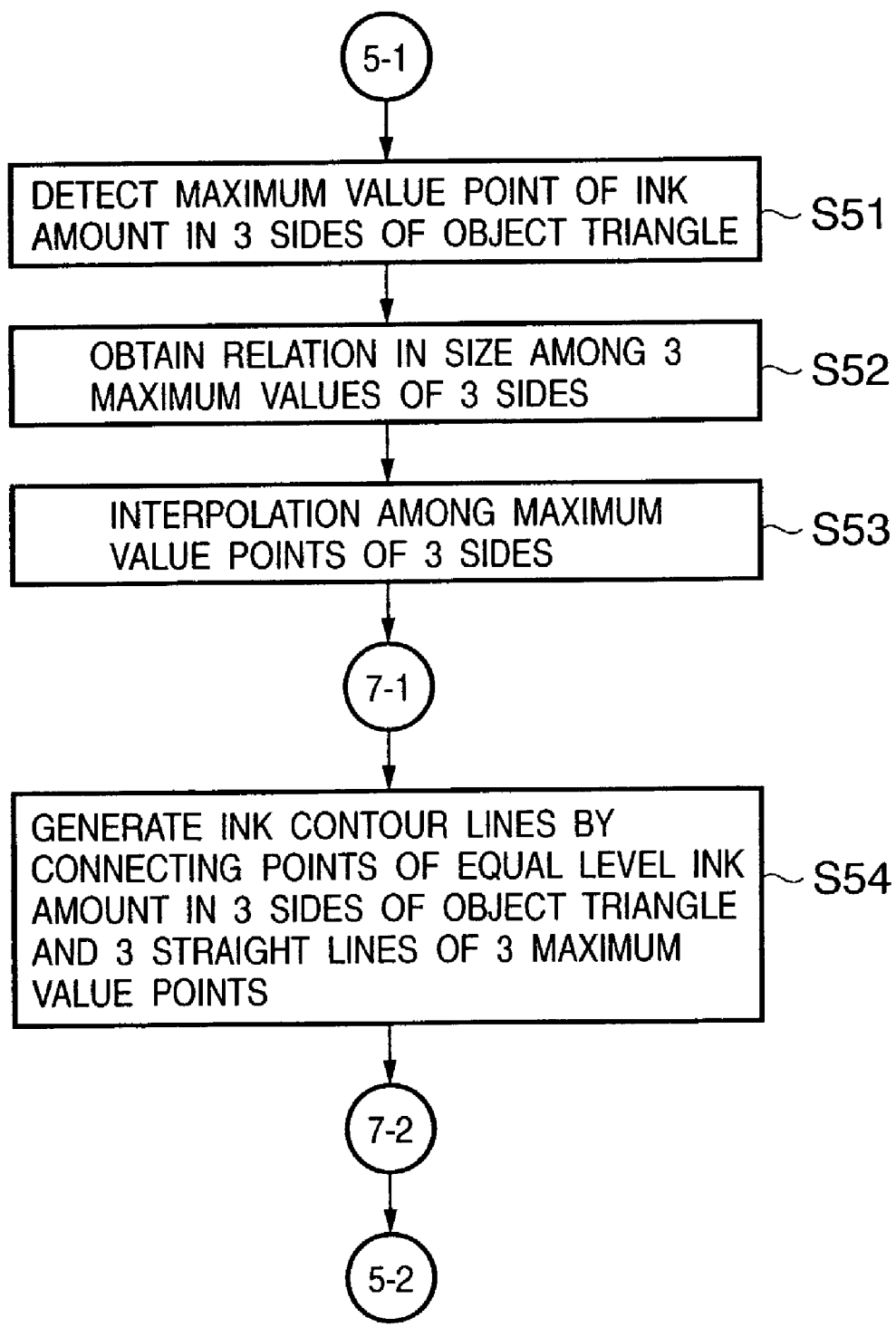
FIG. 23 is a flowchart showing two-dimensional interpolation processing on an object triangle at step S43 in FIG. 21.
Figure 24:
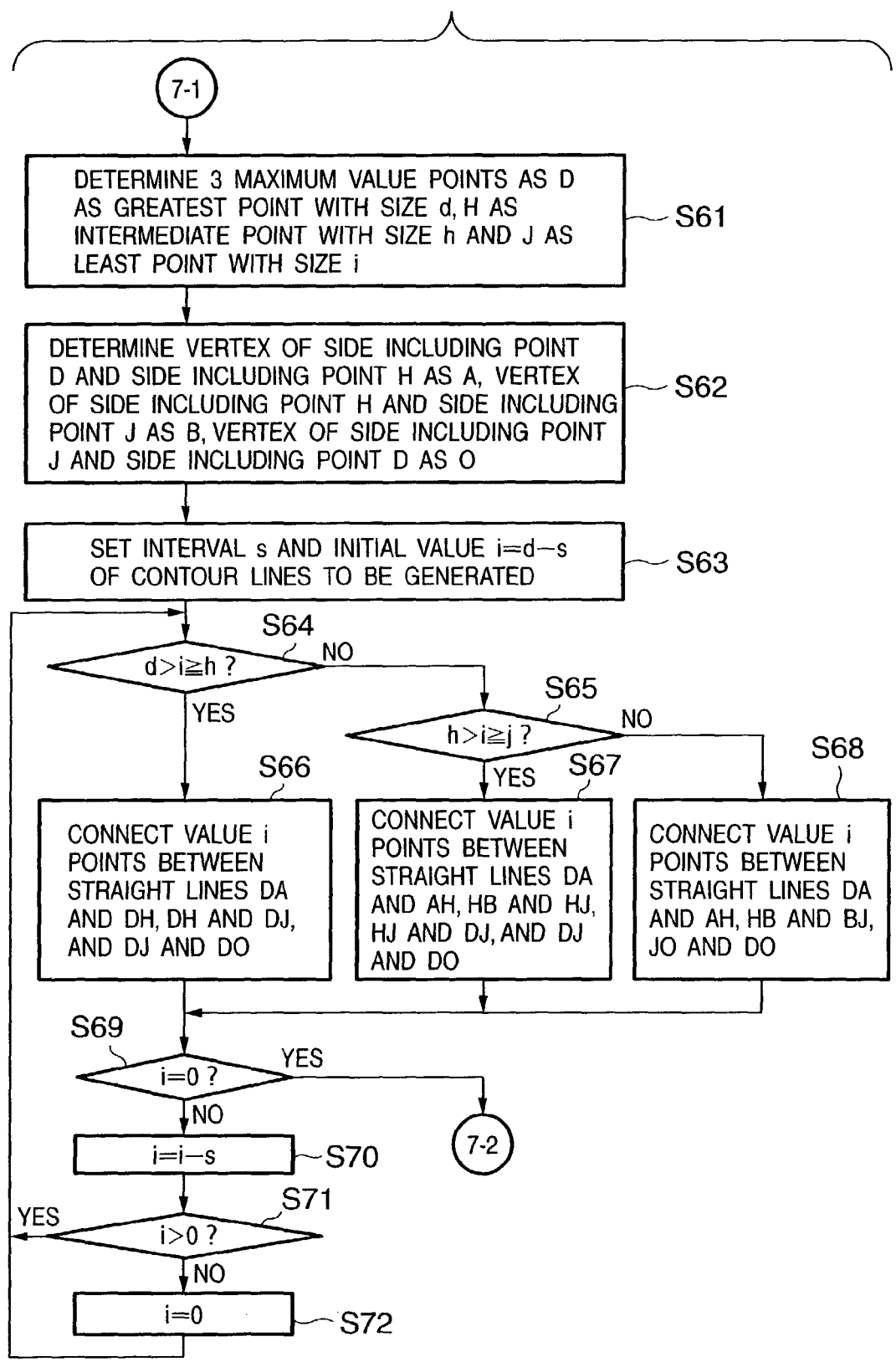
FIG. 24 is a flowchart showing generation of ink contour lines by connecting points of equal level ink amount in 3 sides of object triangle and 3 straight lines of 3 maximum value points, at step S54 in FIG. 23.

FIGS. 23 and 24 are flowcharts showing the two-dimensional interpolation processing on the object triangle in detail. Hereinbelow, the processing in case of FIG. 22 will be described with reference to FIGS. 23 and 24.

In FIG. 23, first, at step S51, maximum value points are detected in ink amounts in the 3 sides of object triangle. Next, at step S52, the relation in size among the 3 maximum values of the 3 sides is obtained. Next, at step S53, interpolation is performed among the maximum value points of the 3 sides. That is, the 3 maximum values of the 3 sides are connected by straight lines, and interpolation is performed from both end values of each line. Next, at step S54, in the 3 sides of the object triangle and the 3 straight lines, points of equivalent ink amount levels are connected as ink contour lines.

Next, the processing at step S54 (FIG. 23) will be described in detail with reference to the flowchart of FIG. 24.

In FIG. 24, first, at step S61, based on the result of processing at steps S52 and S53, the greatest point among the 3 maximum value points is determined as a point D and its size as d, an intermediate point, as a point H and its size as h, and the least point, as a point J and its size as j. In the example of FIG. 22, d=90, h=60 and j=30 hold. Next, at step S62, a vertex of a side including the point D and a side including the point H is determined as A, a vertex of a side including the point H and a side including the point J, as B, and a vertex of a side including the point J and a side including the point D, as O. Next, at step S63, an interval S of contour line to be generated and its initial value i=d−S are set. Hereinbelow, in the loop of steps S64 to S72, contour lines are sequentially generated until the ink amount becomes "0".

First, at step S64, it is determined whether or not d>i≧h holds, and if it holds, the process proceeds to step S66, at which points of value i are connected between straight lines DA and DH, between straight lines DH and DJ, and between straight lines DJ and DO. In FIG. 22, since S=15 hold as the contour line interval, contour lines G0-G1-G2-G3 are generated in a case where i=75 holds, and contour lines H0-H1-H2 are generated in a case where i=60 holds.

Further, if the condition is not satisfied at S64, the process proceeds to step S65, at which it is determined whether or not h>i≧j holds. If h>i≧j holds, the process proceeds to step S67, at which the value i points are connected between straight lines DA and AH, between straight lines HB and HJ, between straight lines HJ and DJ, and between straight lines DJ and DO. In FIG. 22, contour lines I0-I1 and I2-I3-I4-I5 are generated in a case where i=45 holds, and contour lines J0-J1 and J2-J-J3 are generated in a case where i=30 holds. On the other hand, if the condition is not satisfied at step S65, the process proceeds to step S68, at which the value i points are connected between straight lines DA and AH, between straight lines HB and BJ, and between straight lines JD and DO. In FIG. 22, contour lines K0-K1, K2-K3 and K4-K5 are generated in a case where i=15 holds.

Thus, any one of steps S66 to S68 is performed, the process proceeds to step S69, at which it is determined whether or not i=0 holds. If i=0 holds, since the generation of contour lines has been completed in all the object triangles, the process returns to (7–2) in FIG. 23. If i=0 does not hold, the process proceeds to step S70, at which calculation i=i−S is performed, then the process proceeds to step S71, at which it is determined whether or not i>0 holds. If i>0 holds, the process returns to step S64, otherwise, proceeds to step S72 at which i=0 is set, and returns to step S64.

As described above, the processing loop from step S64 to step S72 is repeatedly performed until the contour value i becomes "0".

Note that in FIG. 22, S=15 holds for the sake of simplification of explanation, however, for more precise grid point value representation, it may be arranged such that S=1 holds and a contour line is generated by 1 step.

Hereinbelow, the operation in a case where ink amount curves of 3 sides are different from the example of FIG. 22 will be described with reference to FIGS. 25 to 27.

Figure 25:
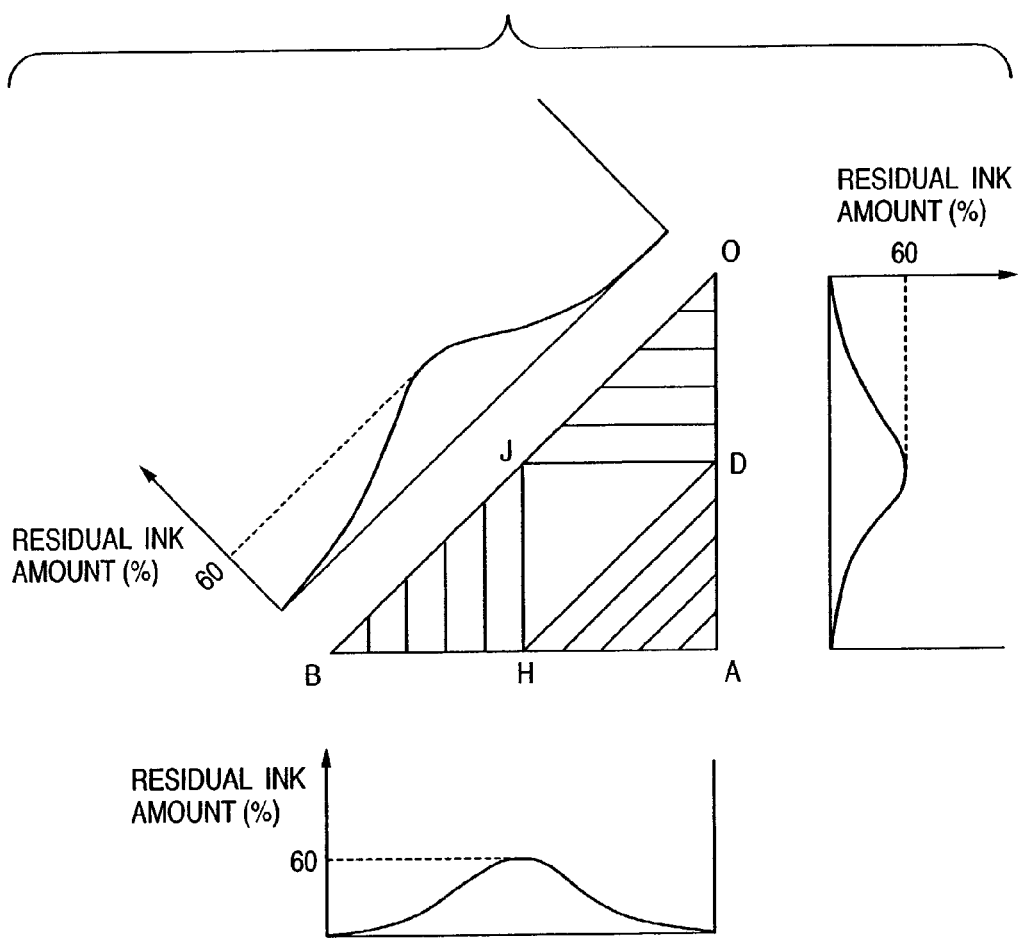
FIG. 25 depicts an explanatory view of generation of contour lines of object triangle in a case where maximum values of 3 sides are the same.

FIG. 25 depicts an example where the percentages of maximum values of 3 sides are 60%. In this case, though not shown in FIG. 24, only the contour line generation step at step S68 is performed and contour lines as shown in FIG. 25 are generated.

Figure 26:
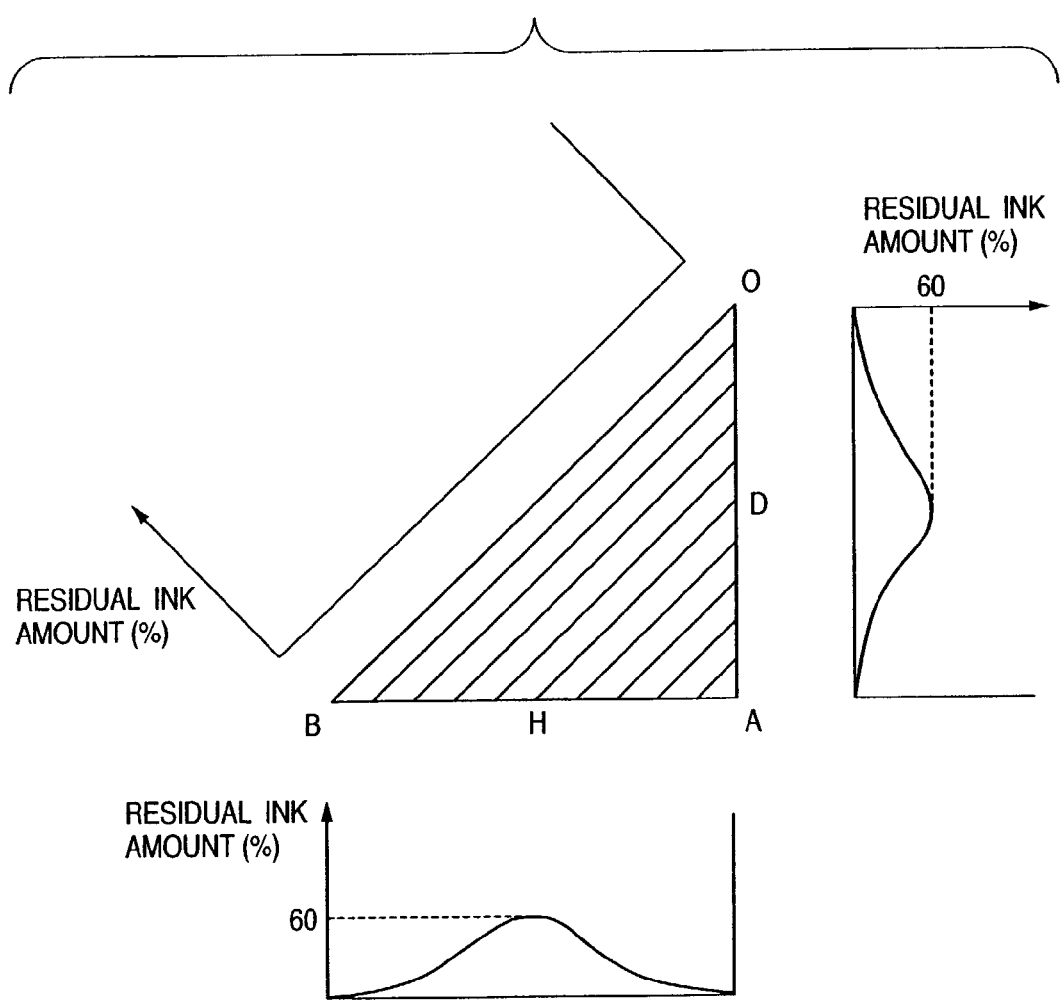
FIG. 26 depicts an explanatory view of generation of contour lines of object triangle in a case where maximum values of 2 sides are the same and that of 1 side is 0.

FIG. 26 depicts a case where ink amounts of one side (OB) are all "0" and the maximum values of the other 2 sides are the same (60%). In this case, the value i points are connected between straight lines DA and AH and between straight lines HB and DO as shown in FIG. 26.

Figure 27:
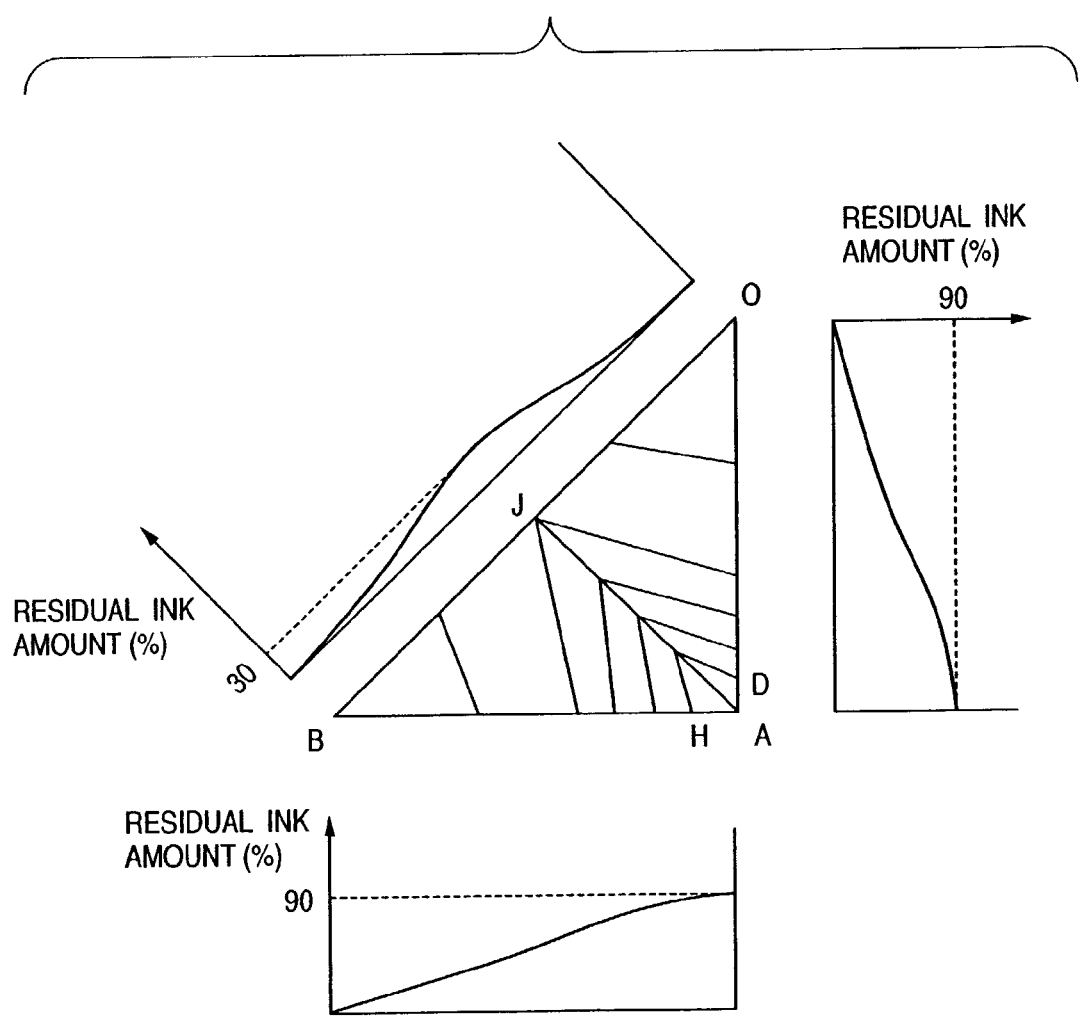
FIG. 27 depicts an explanatory view of generation of contour lines of object triangle in a case where maximum values of 2 sides are the same and overlap with 1 vertex.

FIG. 27 depicts a case where the maximum values of 2 sides (OA) (BA) are the same and the maximum value points overlap with a point A. In this case, no contour line is generated at step S66 in FIG. 24 since the points D, A and H are the same, and the i point connection is not performed between the straight lines DA and AH at step S67 since the points D, A and H are the same, the i point connection is not performed between the straight lines HJ and DJ since the points D and H are the same, and the value i points are connected only between the straight lines HB and HJ and between the straight lines DJ and DO. Further, at step S68, the i point connection is not performed between the straight lines DA and AH since the points D, A and H are the same and the value i points are connected only between the straight lines HB and BJ and between the straight lines JO and DO, and contour lines are generated as shown in FIG. 27.

Figure 28:
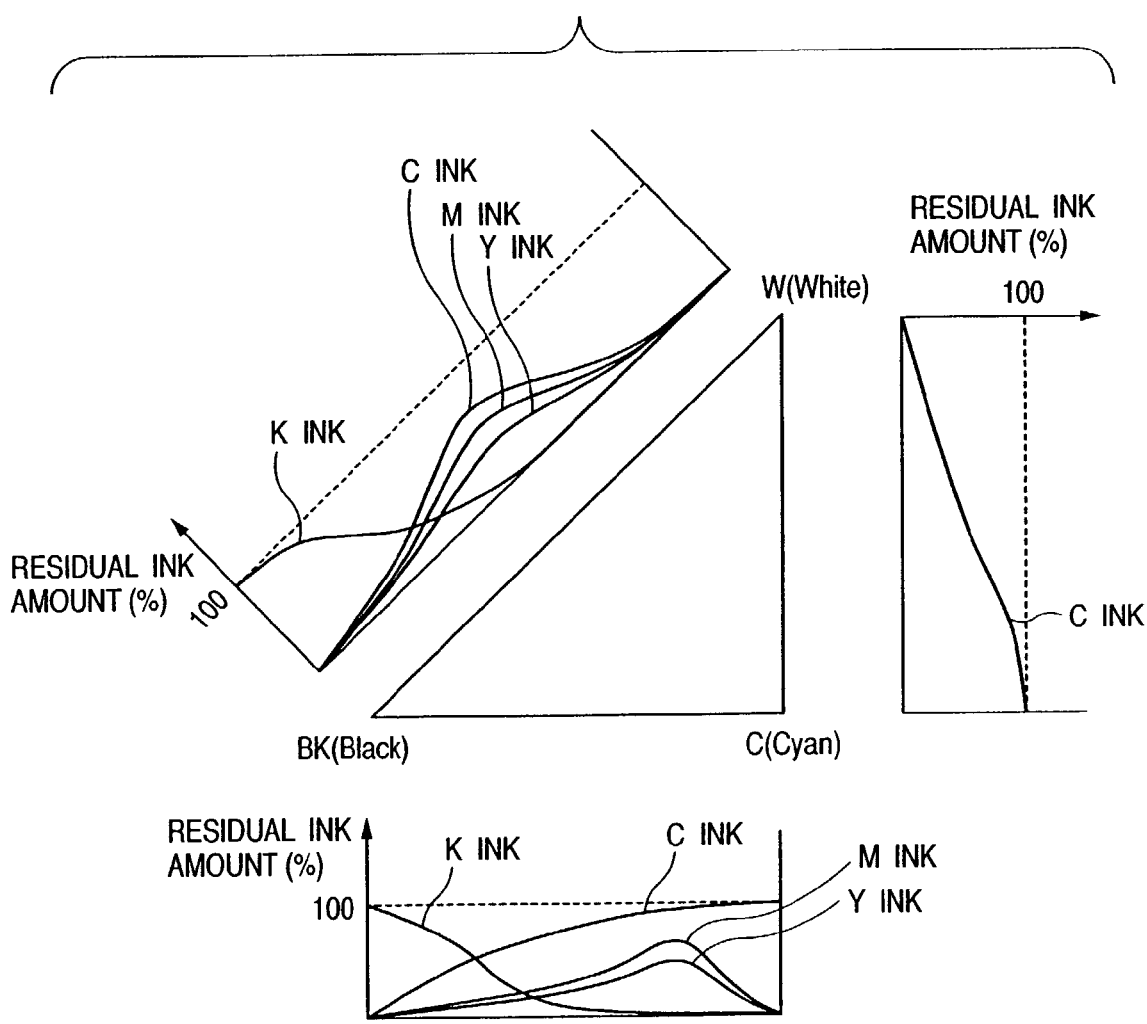
FIG. 28 depicts an explanatory view of interpolation in a triangle with vertexes W-C-Bk in FIGS. 3 to 5, showing an example of curves of C, M, Y and K ink amounts in respective sides.

FIG. 28 depicts an explanatory view of the interpolation in the triangle with vertexes W-C-Bk in FIGS. 3 to 5, showing an example of curves of C, M, Y and K ink color tables in respective sides.

In FIG. 28, for the sake of simplicity of explanation, curves of LC and LM ink color tables are omitted.

Figure 29A:
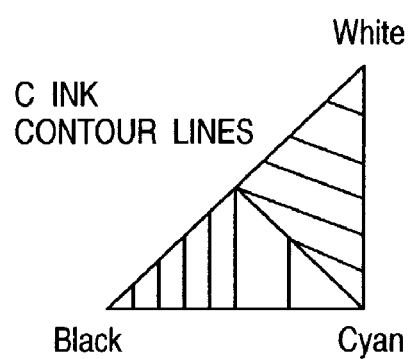
FIGS. 29A to 29D depict examples of C ink contour lines (FIG. 29A), M ink contour lines (FIG. 29B), Y ink contour lines (FIG. 29C) and K ink contour lines (FIG. 29D) in the object triangle in FIG. 28.
Figure 29B:
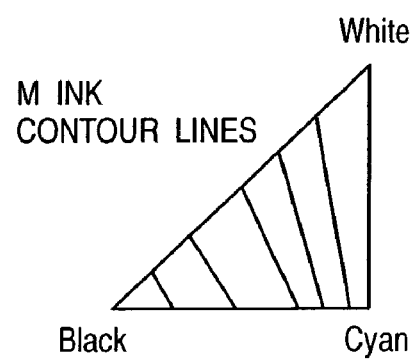
Figure 29C:
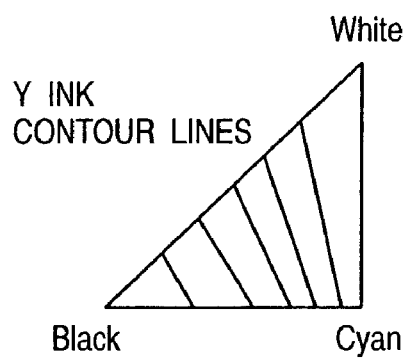
Figure 29D:
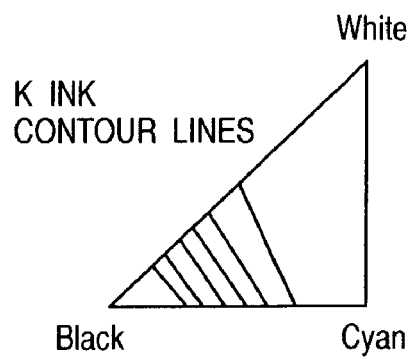
Figure 30:
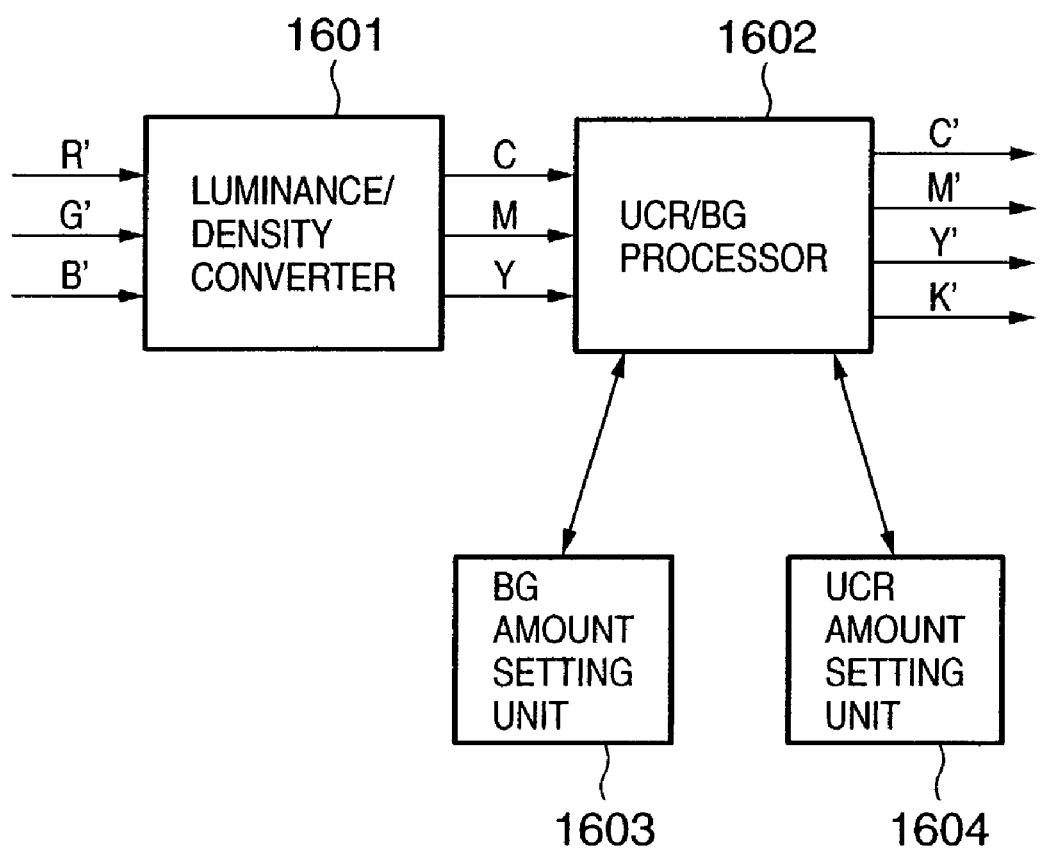
FIG. 30 depicts an explanatory view of conventional processing of separation from input colors to color-printer color material colors.

FIGS. 29A to 29D depict the contour lines of the respective ink colors in FIG. 28. FIG. 29A shows the C ink contour lines in the case of FIG. 27; FIG. 29B, the M ink contour lines in the case of FIG. 26; FIG. 29C, the Y ink contour lines in the case of FIG. 26; and FIG. 29D, the K ink contour lines in the case of FIG. 26. In FIG. 29D, as the black ink is added at a midpoint, a wide "0" ink amount area exists, and the K ink contour lines are generated from the midpoint.

As described above, in the first embodiment, the internal interpolation is adaptively performed based on the ink amount curves of 3 sides of triangle by ink color, thereby optimum independent ink contour lines can be generated from the ink amount curves of the 3 sides. Accordingly, the under color addition points in the ink separation table unit 105 can be controlled in a continuous three-dimensional manner in input color space by controlling 7 under color addition points in gray axes and 6 color hues, i.e., the under color addition points in the 7 lines, W-Bk, C-Bk, M-Bk, Y-Bk, R-Bk, G-Bk and B-Bk lines in the triangles W0-R0-M0, W0-M0-B0, W0-B0-C0, W0-C0-G0, W0-G0-Y0 and W0-Y0-R0.

[Second Embodiment]

In the above-described first embodiment, as the target gray line 1000, the CIE L*a*b* uniform color space is employed, however, the color space is not limited to the above space. For example, three-dimensional color space such as Luv may be used.

[Other Embodiment]

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) holding software program code for performing the functions according to the above-described embodiments to a system or an apparatus, reading the program code with a computer (e.g., CPU, MPU) of the system or apparatus from the storage medium, then executing the program. In this case, the program code read from the storage medium realizes the functions according to the embodiments, and the storage medium holding the program code constitutes the invention. Furthermore, besides aforesaid functions according to the above embodiments are realized by executing the program code which is read by a computer, the present invention includes a case where an OS (operating system) or the like working on the computer performs a part or entire actual processing in accordance with designations of the program code and realizes the functions according to the above embodiments.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiments.

As described above, according to the present invention, as a target gray line is set and ink color separation tables are generated to realize the target color, even if characteristics of ink used in an image forming apparatus and a print medium are different, a desired gray line can be generated.

The present invention is not limited to the above embodiments and various changes and modifications can be made within the spirit and scope of the present invention. Therefore, to appraise the public of the scope of the present invention, the following claims are made.

What is claimed is:

1. A color image processing apparatus for performing color separation to separate image data colors into primary four color-material colors and pale color-material colors of predetermined ones of the primary color-material colors, comprising:

setting means for setting a target gray line connecting white to black for the color separation in predetermined color space;

three color gray generation means for obtaining a combination of three color materials to realize a color on the target gray line;

four color separation processing means for determining amounts of the primary four color materials to realize the color on the target gray line;

total color material amount determination means for determining a total color material amount to realize the target gray line; and color-material amount determination means for, regarding a color which cannot be realized by the combination of primary Y color and the pale color-material colors to realize the color on the target gray line, determining respective color material amounts of the color materials based on the total color material amount and the color material amounts of the primary four colors.

2. The color image processing apparatus according to claim 1, wherein said three color gray generation means includes:

determination means for determining combination amounts of primary CMY colors to realize the color on the target gray line; and combination determination means for determining combination amounts of the primary Y color and LC and LM colors to realize the color on the target gray line.

3. The color image processing apparatus according to claim 1, wherein said 3 color gray generation means includes:

plane setting means for setting respective planes in correspondence with a Y color material;

CM color material amount setting means for setting C and M color material amounts for respective planes set by said plane setting means;

calculation means for calculating intersections between the respective planes and the target gray line; and color material amount calculation means for calculating C, M and Y color material amounts at the intersections calculated by said calculation means.

4. The color image processing apparatus according to claim 1, wherein said three color gray generation means includes:

plane setting means for setting respective planes in correspondence with a Y color material;

LCLM color material amount setting means for setting LC and LM color material amounts for respective planes set by said plane setting means;

calculation means for calculating intersections between the respective planes and the target gray line; and color material amount calculation means for calculating LC, LM and Y color material amounts at the intersections calculated by said calculation means.

5. The color image processing apparatus according to claim 1, wherein the primary four color materials are CMYK ink and the pale color materials are pale cyan and pale magenta ink, and wherein said color-material amount determination means includes:

ratio calculation means for calculating a ratio between deep and pale cyan and deep and pale magenta;

means for calculating a total color material amount of deep and pale cyan and a total color material amount of deep and pale magenta based on the total color material amount, the Y color material amount, a K color material amount and the ratio between the deep and pale cyan and the deep and pale magenta;

means for calculating a deep cyan color material amount and a pale cyan color material amount from the total color material amount of the deep and pale cyan and a target density of the deep and pale cyan; and means for calculating a deep magenta color material amount and a pale magenta color material amount from the total color material amount of the deep and pale magenta and a target density of the deep and pale magenta.

6. The color image processing apparatus according to claim 1, wherein the target gray line corresponds to a virtual line in L*a*b* space connecting a white color of print medium, where an image based on the image data is formed, to a black color in printing using black color material on the print medium.

7. A color image processing method for performing color separation to separate image data colors into primary four color-material colors and pale color-material colors of predetermined ones of the primary color-material colors, comprising:

a setting step of setting a target gray line connecting white to black for the color separation in predetermined color space;

a three color gray generation step of obtaining a combination of three color materials to realize a color on the target gray line;

a four color separation processing step of determining amounts of the primary four color materials to realize the color on the target gray line;

a total color material amount determination step of determining a total color material amount to realize the target gray line; and a color-material amount determination step of, regarding a color which cannot be realized by the combination of primary Y color and the pale color-material colors to realize the color on the target gray line, determining respective color material amounts of the color materials based on the total color material amount and the color material amounts of the primary four colors.

8. The color image processing method according to claim 7, wherein said three color gray generation step includes:

a determination step of determining combination amounts of primary CMY colors to realize the color on the target gray line; and a combination determination step of determining combination amounts of the primary Y color and LC and LM colors to realize the color on the target gray line.

9. The color image processing method according to claim 7, wherein said 3 color gray generation step includes:

a plane setting step of setting respective planes in correspondence with a Y color material;

a CM color material amount setting step of setting C and M color material amounts for respective planes set in said plane setting step;

a calculation step of calculating intersections between the respective planes and the target gray line; and a color material amount calculation step of calculating C, M and Y color material amounts at the intersections calculated in said calculation step.

10. The color image processing method according to claim 7, wherein said three color gray generation step includes:

a plane setting step of setting respective planes in correspondence with a Y color material;

an LCLM color material amount setting step of setting LC and LM color material amounts for respective planes set in said plane setting step;

a calculation step of calculating intersections between the respective planes and the target gray line; and a color material amount calculation step of calculating LC, LM and Y color material amounts at the intersections calculated in said calculation step.

11. The color image processing method according to claim 7, wherein the primary four color materials are CMYK ink and the pale color materials are pale cyan and pale magenta ink, and wherein said color-material amount determination step includes:

a ratio calculation step of calculating a ratio between deep and pale cyan and deep and pale magenta;

a step of calculating a total color material amount of deep and pale cyan and a total color material amount of deep and pale magenta based on the total color material amount, the Y color material amount, a K color material amount and the ratio between the deep and pale cyan and the deep and pale magenta;

a step of calculating a deep cyan color material amount and a pale cyan color material amount from the total color material amount of the deep and pale cyan and a target density of the deep and pale cyan; and a step of calculating a deep magenta color material amount and a pale magenta color material amount from the total color material amount of the deep and pale magenta and a target density of the deep and pale magenta.

12. The color image processing method according to claim 7, wherein the target gray line corresponds to a virtual line in L*a*b* space connecting a white color of print medium, where an image based on the image data is formed, to a black color in printing using black color material on the print medium.

13. A program for performing the color image processing method according to claim 7.

14. A computer-readable storage medium holding a program for performing the color image processing method according to claim 7.

15. A color image processing apparatus for performing color separation to separate image data colors into primary four colors represented by four color-materials, at least one of which is constituted by pale color-material and deep color-material, comprising:

obtaining means for obtaining a density or luminance characteristics when the pale color-material and deep color-material are mixed;

first setting means for setting a target density or target luminance after the pale color-material and deep color-material are separated;

second setting means for setting a total amount of color-materials after the pale color-material and deep color-material are separated; and acquisition means for acquiring an amount of the pale and deep color-materials to obtain the target density or target luminance and the total amount of color-materials, based on the density or luminance characteristics obtained by said obtaining means.

16. The apparatus according to claim 15, wherein said acquisition means acquires the amount of the pale and deep color-materials based on a point of intersection of an equal density line or an equal luminance line defined by the density or luminance characteristics and a line of equal amount of color-materials.

17. The apparatus according to claim 15, wherein said obtaining means plots an amount of the pale and deep color-materials on a two-dimensional grid and obtains the density or luminance characteristics based on a value of a density or luminance corresponding to each point of grid, and the total amount of the pale and deep color-materials.

18. The apparatus according to claim 16, wherein said acquisition means comprising:

means for plotting an amount of the pale and deep color-materials on a two-dimensional grid and obtaining the equal density line or the equal luminance line and the line of equal amount of color-materials, using an interpolation processing based on a value of a density or luminance corresponding to each point of grid and the total amount of the pale and deep color-materials; and means for obtaining a point of intersection of the equal density line or the equal luminance line and the line of equal amount of color-materials.

* * * * *

UNITED STATES PATENT AND TRADEMARK OFFICE
CERTIFICATE OF CORRECTION

PATENT NO. : 7,123,391 B2
APPLICATION NO. : 10/253937
DATED : October 17, 2006
INVENTOR(S) : Kazuhiro Saito It is certified that error appears in the above-identified patent and that said Letters Patent is hereby corrected as shown below:

COLUMN 7

Line 8, "realize" should read --realizing--; and
    Line 10, "6" should read --6 colors--.

COLUMN 8

Line 22, "it" should be deleted; and
    Line 26, "ink" should read --inks--.

COLUMN 10

Line 13, "geometries" should read --geometries;--.

COLUMN 12

Line 2, "hold" should read --holds--.

COLUMN 14

Line 46, "3" should read --three--.

COLUMN 16

Line 2, "3" should read --three--.

UNITED STATES PATENT AND TRADEMARK OFFICE
CERTIFICATE OF CORRECTION

PATENT NO. : 7,123,391 B2
APPLICATION NO. : 10/253937
DATED : October 17, 2006
INVENTOR(S) : Kazuhiro Saito It is certified that error appears in the above-identified patent and that said Letters Patent is hereby corrected as shown below:

COLUMN 18

Line 6, "comprising:" should read --comprises:--.

Signed and Sealed this

Tenth Day of July, 2007

JON W. DUDAS
*Director of the United States Patent and Trademark Office*